US008855226B2

(12) United States Patent
Medvedev et al.

(10) Patent No.: US 8,855,226 B2
(45) Date of Patent: Oct. 7, 2014

(54) RATE SELECTION WITH MARGIN SHARING

(75) Inventors: Irina Medvedev, Somerville, MA (US); J. Rodney Walton, Carlisle, MA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 12/270,842

(22) Filed: Nov. 13, 2008

(65) Prior Publication Data

US 2009/0129454 A1    May 21, 2009

Related U.S. Application Data

(62) Division of application No. 11/128,698, filed on May 12, 2005, now Pat. No. 7,466,749.

(51) Int. Cl.
*H04B 7/02*        (2006.01)
*H04L 1/00*        (2006.01)
*H04B 7/04*        (2006.01)

(52) U.S. Cl.
CPC ............ *H04L 1/0002* (2013.01); *H04L 1/0015* (2013.01); *Y02B 60/31* (2013.01); *H04B 7/0413* (2013.01)
USPC ......... 375/267; 375/299; 455/101; 455/452.2

(58) Field of Classification Search
USPC ......... 375/227, 346, 295, 260–261, 267, 271, 375/299; 370/338, 465; 455/95, 101–103
See application file for complete search history.

(56) References Cited

U.S. PATENT DOCUMENTS

| 4,736,371 A | 4/1988 | Tejima et al. |
| 4,750,198 A | 6/1988 | Harper |
| 4,797,879 A | 1/1989 | Habbab et al. |

(Continued)

FOREIGN PATENT DOCUMENTS

| AU | 2002259221 | 11/2002 |
| CA | 2690245 A1 | 10/2001 |

(Continued)

OTHER PUBLICATIONS

Wyglinski Physical Layer Loading Algorithms for Indoor Wireless Multicarrier Systems, p. 109 Nov. 2004.*

(Continued)

*Primary Examiner* — Sophia Vlahos
(74) *Attorney, Agent, or Firm* — QUALCOMM IP Department; James Hunt Yancey, Jr.

(57) ABSTRACT

Rate selection with margin sharing in a system with independent data stream rates is presented. Signal-to-Noise Ratio (SNR) estimates are obtained for each stream. Rates are selected for the streams based on the SNR estimates, such that at least one data stream has an SNR margin below a threshold, each remaining data stream has an SNR margin above a respective threshold, and the total SNR margin for all streams is above a total threshold. For rate selection with margin sharing with a vector-quantized rate set, SNR estimates are obtained for usable transmission channels. The total SNR margin is determined for each rate combination based on the estimates. Each rate combination is associated with a specific number of data streams to transmit, a specific rate for each data stream, and a specific overall throughput. The combination with the highest overall throughput and non-negative total SNR margin is selected.

14 Claims, 9 Drawing Sheets

(56) References Cited

U.S. PATENT DOCUMENTS

| | | | |
|---|---|---|---|
| 5,239,677 A | 8/1993 | Jasinski | |
| 5,241,544 A | 8/1993 | Jasper et al. | |
| 5,295,159 A | 3/1994 | Kerpez | |
| 5,404,355 A | 4/1995 | Raith | |
| 5,422,733 A | 6/1995 | Merchant et al. | |
| 5,471,647 A | 11/1995 | Gerlach et al. | |
| 5,479,447 A | 12/1995 | Chow et al. | |
| 5,491,837 A | 2/1996 | Haartsen | |
| 5,493,712 A | 2/1996 | Ramesh et al. | |
| 5,506,861 A | 4/1996 | Bottomley | |
| 5,509,003 A | 4/1996 | Snijders et al. | |
| 5,528,581 A | 6/1996 | De Bot | |
| 5,606,729 A | 2/1997 | Damico et al. | |
| 5,638,369 A | 6/1997 | Ayerst et al. | |
| 5,677,909 A | 10/1997 | Heide | |
| 5,729,542 A | 3/1998 | Dupont | |
| 5,790,550 A * | 8/1998 | Peeters et al. | 370/480 |
| 5,818,813 A | 10/1998 | Saito et al. | |
| 5,822,374 A | 10/1998 | Levin | |
| 5,832,387 A | 11/1998 | Bae et al. | |
| 5,859,875 A | 1/1999 | Kato et al. | |
| 5,867,478 A | 2/1999 | Baum et al. | |
| 5,867,539 A | 2/1999 | Koslov | |
| 5,883,887 A | 3/1999 | Take et al. | |
| 5,886,988 A | 3/1999 | Yun et al. | |
| 5,959,965 A | 9/1999 | Ohkubo et al. | |
| 5,973,638 A | 10/1999 | Robbins et al. | |
| 5,982,327 A | 11/1999 | Vook et al. | |
| 6,005,876 A | 12/1999 | Cimini, Jr. et al. | |
| 6,011,963 A | 1/2000 | Ogoro | |
| 6,049,548 A | 4/2000 | Bruno et al. | |
| 6,067,290 A | 5/2000 | Paulraj et al. | |
| 6,072,779 A | 6/2000 | Tzannes et al. | |
| 6,084,915 A | 7/2000 | Williams | |
| 6,097,771 A | 8/2000 | Foschini | |
| 6,115,354 A | 9/2000 | Weck | |
| 6,122,247 A | 9/2000 | Levin et al. | |
| 6,131,016 A | 10/2000 | Greenstein et al. | |
| 6,141,388 A | 10/2000 | Servais et al. | |
| 6,141,542 A | 10/2000 | Kotzin et al. | |
| 6,141,567 A | 10/2000 | Youssefmir et al. | |
| 6,144,711 A | 11/2000 | Raleigh et al. | |
| 6,154,661 A | 11/2000 | Goldburg | |
| 6,163,296 A | 12/2000 | Lier et al. | |
| 6,167,031 A | 12/2000 | Olofsson et al. | |
| 6,175,588 B1 | 1/2001 | Visotsky et al. | |
| 6,178,196 B1 | 1/2001 | Naguib et al. | |
| 6,192,256 B1 | 2/2001 | Whinnett | |
| 6,205,410 B1 | 3/2001 | Cai | |
| 6,222,888 B1 | 4/2001 | Kao et al. | |
| 6,232,918 B1 | 5/2001 | Wax et al. | |
| 6,266,528 B1 | 7/2001 | Farzaneh | |
| 6,275,543 B1 | 8/2001 | Petrus et al. | |
| 6,278,726 B1 | 8/2001 | Mesecher et al. | |
| 6,292,917 B1 | 9/2001 | Sinha et al. | |
| 6,298,035 B1 | 10/2001 | Heiskala | |
| 6,298,092 B1 | 10/2001 | Heath, Jr. et al. | |
| 6,308,080 B1 | 10/2001 | Burt et al. | |
| 6,314,113 B1 | 11/2001 | Guemas | |
| 6,314,289 B1 | 11/2001 | Eberlein et al. | |
| 6,317,612 B1 | 11/2001 | Farsakh | |
| 6,330,277 B1 | 12/2001 | Gelblum et al. | |
| 6,330,293 B1 | 12/2001 | Klank et al. | |
| 6,330,462 B1 | 12/2001 | Chen | |
| 6,333,953 B1 | 12/2001 | Bottomley et al. | |
| 6,339,399 B1 | 1/2002 | Andersson et al. | |
| 6,345,036 B1 | 2/2002 | Sudo et al. | |
| 6,346,910 B1 | 2/2002 | Ito | |
| 6,347,234 B1 | 2/2002 | Scherzer | |
| 6,351,499 B1 | 2/2002 | Paulraj et al. | |
| 6,363,267 B1 | 3/2002 | Lindskog et al. | |
| 6,369,758 B1 | 4/2002 | Zhang | |
| 6,377,812 B1 | 4/2002 | Rashid-Farrokhi et al. | |
| 6,385,264 B1 | 5/2002 | Terasawa et al. | |
| 6,426,971 B1 | 7/2002 | Wu et al. | |
| 6,452,981 B1 | 9/2002 | Raleigh et al. | |
| 6,463,290 B1 | 10/2002 | Stilp et al. | |
| 6,473,467 B1 | 10/2002 | Wallace et al. | |
| 6,478,422 B1 | 11/2002 | Hansen | |
| 6,492,942 B1 | 12/2002 | Kezys | |
| 6,510,184 B1 | 1/2003 | Okamura | |
| 6,512,737 B1 | 1/2003 | Agee | |
| 6,515,617 B1 | 2/2003 | Demers et al. | |
| 6,532,225 B1 | 3/2003 | Chang et al. | |
| 6,532,255 B1 | 3/2003 | Gunzelmann et al. | |
| 6,532,562 B1 | 3/2003 | Chou et al. | |
| 6,545,997 B1 | 4/2003 | Bohnke et al. | |
| 6,574,211 B2 | 6/2003 | Padovani et al. | |
| 6,574,267 B1 | 6/2003 | Kanterakis et al. | |
| 6,574,271 B2 | 6/2003 | Mesecher et al. | |
| 6,594,473 B1 | 7/2003 | Dabak et al. | |
| 6,594,798 B1 | 7/2003 | Chou et al. | |
| 6,597,682 B1 | 7/2003 | Kari | |
| 6,608,874 B1 | 8/2003 | Beidas et al. | |
| 6,611,231 B2 | 8/2003 | Crilly, Jr. et al. | |
| 6,615,024 B1 | 9/2003 | Boros et al. | |
| 6,631,121 B1 | 10/2003 | Yoon | |
| 6,636,496 B1 | 10/2003 | Cho et al. | |
| 6,636,568 B2 | 10/2003 | Kadous | |
| 6,654,590 B2 | 11/2003 | Boros et al. | |
| 6,654,613 B1 | 11/2003 | Maeng et al. | |
| 6,668,161 B2 | 12/2003 | Boros et al. | |
| 6,683,916 B1 | 1/2004 | Sartori et al. | |
| 6,690,660 B2 | 2/2004 | Kim et al. | |
| 6,693,992 B2 | 2/2004 | Jones et al. | |
| 6,694,155 B1 | 2/2004 | Chin et al. | |
| 6,697,346 B1 | 2/2004 | Halton et al. | |
| 6,711,121 B1 | 3/2004 | Gerakoulis et al. | |
| 6,728,233 B1 | 4/2004 | Park et al. | |
| 6,731,668 B2 | 5/2004 | Ketchum | |
| 6,735,188 B1 | 5/2004 | Becker et al. | |
| 6,738,020 B1 | 5/2004 | Lindskog et al. | |
| 6,744,811 B1 | 6/2004 | Kantschuk | |
| 6,751,187 B2 * | 6/2004 | Walton et al. | 370/210 |
| 6,751,444 B1 | 6/2004 | Meiyappan | |
| 6,751,480 B2 | 6/2004 | Kogiantis et al. | |
| 6,757,263 B1 | 6/2004 | Olds | |
| 6,760,313 B1 | 7/2004 | Sindhushayana et al. | |
| 6,760,388 B2 | 7/2004 | Ketchum et al. | |
| 6,760,882 B1 | 7/2004 | Gesbert et al. | |
| 6,763,244 B2 | 7/2004 | Chen et al. | |
| 6,768,727 B1 | 7/2004 | Sourour et al. | |
| 6,771,706 B2 | 8/2004 | Ling et al. | |
| 6,785,341 B2 | 8/2004 | Walton et al. | |
| 6,785,513 B1 | 8/2004 | Sivaprakasam | |
| 6,788,948 B2 | 9/2004 | Lindskog et al. | |
| 6,792,041 B1 | 9/2004 | Kim et al. | |
| 6,795,424 B1 | 9/2004 | Kapoor et al. | |
| 6,798,738 B1 | 9/2004 | Do et al. | |
| 6,801,790 B2 | 10/2004 | Rudrapatna | |
| 6,802,035 B2 | 10/2004 | Catreux et al. | |
| 6,804,191 B2 | 10/2004 | Richardson | |
| 6,821,535 B2 | 11/2004 | Nurmi et al. | |
| 6,842,460 B1 | 1/2005 | Olkkonen et al. | |
| 6,847,828 B2 | 1/2005 | Miyoshi et al. | |
| 6,850,252 B1 | 2/2005 | Hoffberg | |
| 6,850,498 B2 | 2/2005 | Heath et al. | |
| 6,859,503 B2 | 2/2005 | Pautler et al. | |
| 6,862,271 B2 | 3/2005 | Medvedev et al. | |
| 6,862,440 B2 | 3/2005 | Sampath | |
| 6,868,079 B1 | 3/2005 | Hunt | |
| 6,873,651 B2 | 3/2005 | Tesfai et al. | |
| 6,879,578 B2 | 4/2005 | Pan et al. | |
| 6,879,579 B1 | 4/2005 | Myles et al. | |
| 6,882,868 B1 | 4/2005 | Shattil | |
| 6,885,708 B2 | 4/2005 | Thomas et al. | |
| 6,888,809 B1 | 5/2005 | Foschini et al. | |
| 6,888,899 B2 | 5/2005 | Raleigh et al. | |
| 6,891,858 B1 | 5/2005 | Mahesh et al. | |
| 6,920,192 B1 | 7/2005 | Laroia et al. | |
| 6,920,194 B2 | 7/2005 | Stopler et al. | |
| 6,927,728 B2 | 8/2005 | Vook et al. | |
| 6,937,592 B1 | 8/2005 | Heath, Jr. et al. | |
| 6,940,917 B2 | 9/2005 | Menon et al. | |

(56) References Cited

U.S. PATENT DOCUMENTS

| | | |
|---|---|---|
| 6,950,632 B1 | 9/2005 | Yun et al. |
| 6,952,426 B2 | 10/2005 | Wu et al. |
| 6,952,454 B1 | 10/2005 | Jalali et al. |
| 6,956,813 B2 | 10/2005 | Fukuda |
| 6,956,906 B2 | 10/2005 | Tager et al. |
| 6,959,171 B2 | 10/2005 | Tsien et al. |
| 6,963,742 B2 | 11/2005 | Boros et al. |
| 6,965,762 B2 | 11/2005 | Sugar et al. |
| 6,970,722 B1 | 11/2005 | Lewis |
| 6,980,601 B2 * | 12/2005 | Jones ............................. 375/261 |
| 6,980,800 B2 | 12/2005 | Noerpel et al. |
| 6,985,434 B2 | 1/2006 | Wu et al. |
| 6,985,534 B1 | 1/2006 | Meister |
| 6,987,819 B2 | 1/2006 | Thomas et al. |
| 6,990,059 B1 | 1/2006 | Anikhindi et al. |
| 6,992,972 B2 | 1/2006 | Van Nee |
| 6,996,380 B2 | 2/2006 | Dent |
| 7,002,900 B2 | 2/2006 | Walton et al. |
| 7,006,464 B1 | 2/2006 | Gopalakrishnan et al. |
| 7,006,483 B2 | 2/2006 | Nelson, Jr. et al. |
| 7,006,848 B2 | 2/2006 | Ling et al. |
| 7,009,931 B2 | 3/2006 | Ma et al. |
| 7,012,978 B2 | 3/2006 | Talwar |
| 7,020,110 B2 | 3/2006 | Walton et al. |
| 7,020,482 B2 | 3/2006 | Medvedev et al. |
| 7,020,490 B2 | 3/2006 | Khatri |
| 7,023,826 B2 | 4/2006 | Sjoberg et al. |
| 7,024,163 B1 | 4/2006 | Barratt et al. |
| 7,031,671 B2 | 4/2006 | Mottier |
| 7,035,359 B2 | 4/2006 | Molnar |
| 7,039,125 B2 | 5/2006 | Friedman |
| 7,042,858 B1 | 5/2006 | Ma et al. |
| 7,054,378 B2 | 5/2006 | Walton et al. |
| 7,058,367 B1 | 6/2006 | Luo et al. |
| 7,062,294 B1 | 6/2006 | Rogard et al. |
| 7,068,628 B2 | 6/2006 | Li et al. |
| 7,072,381 B2 | 7/2006 | Atarashi et al. |
| 7,072,410 B1 | 7/2006 | Monsen |
| 7,072,413 B2 * | 7/2006 | Walton et al. ................. 375/267 |
| 7,088,671 B1 | 8/2006 | Monsen |
| 7,095,709 B2 | 8/2006 | Walton et al. |
| 7,095,722 B1 | 8/2006 | Walke et al. |
| 7,099,377 B2 | 8/2006 | Berens et al. |
| 7,103,325 B1 | 9/2006 | Jia et al. |
| 7,110,378 B2 | 9/2006 | Onggosanusi et al. |
| 7,110,463 B2 | 9/2006 | Wallace et al. |
| 7,113,499 B2 | 9/2006 | Nafie et al. |
| 7,116,652 B2 | 10/2006 | Lozano |
| 7,120,199 B2 | 10/2006 | Thielecke et al. |
| 7,127,009 B2 | 10/2006 | Berthet et al. |
| 7,130,362 B2 | 10/2006 | Girardeau et al. |
| 7,133,459 B2 | 11/2006 | Onggosanusi et al. |
| 7,137,047 B2 | 11/2006 | Mitlin et al. |
| 7,149,239 B2 | 12/2006 | Hudson |
| 7,149,254 B2 | 12/2006 | Sampath |
| 7,151,809 B2 | 12/2006 | Ketchum et al. |
| 7,155,171 B2 | 12/2006 | Ebert et al. |
| 7,158,563 B2 | 1/2007 | Ginis et al. |
| 7,164,649 B2 | 1/2007 | Walton et al. |
| 7,164,669 B2 | 1/2007 | Li et al. |
| 7,184,713 B2 | 2/2007 | Kadous et al. |
| 7,187,646 B2 | 3/2007 | Schramm |
| 7,190,749 B2 | 3/2007 | Levin et al. |
| 7,191,381 B2 | 3/2007 | Gesbert et al. |
| 7,194,237 B2 | 3/2007 | Sugar et al. |
| 7,197,084 B2 | 3/2007 | Ketchum et al. |
| 7,200,404 B2 | 4/2007 | Panasik et al. |
| 7,206,354 B2 | 4/2007 | Wallace et al. |
| 7,218,684 B2 | 5/2007 | Bolourchi et al. |
| 7,221,956 B2 | 5/2007 | Medvedev et al. |
| 7,224,704 B2 | 5/2007 | Lu et al. |
| 7,231,184 B2 | 6/2007 | Eilts et al. |
| 7,233,625 B2 | 6/2007 | Ma et al. |
| 7,238,508 B2 | 7/2007 | Lin et al. |
| 7,242,727 B2 | 7/2007 | Liu et al. |
| 7,248,638 B1 | 7/2007 | Banister |
| 7,248,841 B2 | 7/2007 | Agee et al. |
| 7,254,171 B2 | 8/2007 | Hudson |
| 7,260,153 B2 | 8/2007 | Nissani (Nissensohn) |
| 7,260,366 B2 | 8/2007 | Lee et al. |
| 7,263,119 B1 | 8/2007 | Hsu et al. |
| 7,274,734 B2 | 9/2007 | Tsatsanis |
| 7,277,679 B1 | 10/2007 | Barratt et al. |
| 7,280,467 B2 | 10/2007 | Smee et al. |
| 7,280,625 B2 | 10/2007 | Ketchum et al. |
| 7,283,508 B2 | 10/2007 | Choi et al. |
| 7,289,570 B2 | 10/2007 | Schmidl et al. |
| 7,292,854 B2 | 11/2007 | Das et al. |
| 7,298,778 B2 | 11/2007 | Visoz et al. |
| 7,298,805 B2 | 11/2007 | Walton et al. |
| 7,308,035 B2 | 12/2007 | Rouquette et al. |
| 7,310,304 B2 | 12/2007 | Mody et al. |
| 7,317,750 B2 | 1/2008 | Shattil |
| 7,324,429 B2 | 1/2008 | Walton et al. |
| 7,327,800 B2 | 2/2008 | Oprea et al. |
| 7,333,556 B2 * | 2/2008 | Maltsev et al. ................ 375/295 |
| 7,342,912 B1 | 3/2008 | Kerr et al. |
| 7,356,004 B2 | 4/2008 | Yano et al. |
| 7,356,089 B2 | 4/2008 | Jia et al. |
| 7,379,492 B2 | 5/2008 | Hwang |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 | 9/2008 | Malaender et al. |
| 7,453,844 B1 | 11/2008 | Lee et al. |
| 7,466,749 B2 | 12/2008 | Medvedev et al. |
| 7,480,278 B2 | 1/2009 | Pedersen et al. |
| 7,486,740 B2 | 2/2009 | Inanoglu |
| 7,492,737 B1 | 2/2009 | Fong et al. |
| 7,548,506 B2 | 6/2009 | Ma et al. |
| 7,551,546 B2 | 6/2009 | Ma et al. |
| 7,551,580 B2 | 6/2009 | du Crest et al. |
| 7,573,805 B2 | 8/2009 | Zhuang et al. |
| 7,599,443 B2 | 10/2009 | Ionescu et al. |
| 7,603,141 B2 | 10/2009 | Dravida |
| 7,606,296 B1 | 10/2009 | Hsu et al. |
| 7,606,319 B2 | 10/2009 | Zhang et al. |
| 7,623,871 B2 | 11/2009 | Sheynblat |
| 7,636,573 B2 | 12/2009 | Walton et al. |
| 7,646,747 B2 | 1/2010 | Atarashi et al. |
| 7,653,142 B2 | 1/2010 | Ketchum et al. |
| 7,653,415 B2 | 1/2010 | van Rooyen |
| 7,822,140 B2 | 10/2010 | Catreux et al. |
| 7,986,742 B2 | 7/2011 | Ketchum et al. |
| 8,145,179 B2 | 3/2012 | Walton et al. |
| 8,170,513 B2 | 5/2012 | Walton et al. |
| 8,254,246 B2 | 8/2012 | Ma et al. |
| 8,260,210 B2 | 9/2012 | Esteve et al. |
| 8,325,836 B2 | 12/2012 | Tong et al. |
| 8,358,714 B2 | 1/2013 | Walton et al. |
| 8,406,118 B2 | 3/2013 | Zhu et al. |
| 8,462,643 B2 | 6/2013 | Walton et al. |
| 8,483,188 B2 | 7/2013 | Walton et al. |
| 2001/0017881 A1 | 8/2001 | Bhatoolaul et al. |
| 2001/0031014 A1 * | 10/2001 | Subramanian et al. ....... 375/260 |
| 2001/0031621 A1 | 10/2001 | Schmutz |
| 2001/0033623 A1 | 10/2001 | Hosur |
| 2001/0046205 A1 | 11/2001 | Easton et al. |
| 2002/0003774 A1 | 1/2002 | Wang et al. |
| 2002/0004920 A1 | 1/2002 | Cho et al. |
| 2002/0018310 A1 | 2/2002 | Hung |
| 2002/0018453 A1 | 2/2002 | Yu et al. |
| 2002/0027951 A1 | 3/2002 | Gormley et al. |
| 2002/0041632 A1 | 4/2002 | Sato et al. |
| 2002/0044591 A1 | 4/2002 | Lee et al. |
| 2002/0044610 A1 | 4/2002 | Jones |
| 2002/0057659 A1 | 5/2002 | Ozluturk et al. |
| 2002/0062472 A1 | 5/2002 | Medlock et al. |
| 2002/0064214 A1 | 5/2002 | Hattori et al. |
| 2002/0075830 A1 | 6/2002 | Hartman, Jr. |
| 2002/0085620 A1 | 7/2002 | Mesecher |
| 2002/0085641 A1 | 7/2002 | Baum |
| 2002/0098872 A1 | 7/2002 | Judson |
| 2002/0105928 A1 | 8/2002 | Kapoor et al. |

(56) References Cited

U.S. PATENT DOCUMENTS

| | | |
|---|---|---|
| 2002/0115473 A1 | 8/2002 | Hwang et al. |
| 2002/0122381 A1 | 9/2002 | Wu et al. |
| 2002/0122393 A1 | 9/2002 | Caldwell et al. |
| 2002/0150182 A1 | 10/2002 | Dogan et al. |
| 2002/0154705 A1 | 10/2002 | Walton et al. |
| 2002/0183010 A1 | 12/2002 | Catreux et al. |
| 2002/0184453 A1 | 12/2002 | Hughes et al. |
| 2002/0191535 A1 | 12/2002 | Sugiyama et al. |
| 2002/0193146 A1 | 12/2002 | Wallace et al. |
| 2002/0196842 A1 | 12/2002 | Onggosanusi et al. |
| 2003/0002450 A1 | 1/2003 | Jalali et al. |
| 2003/0007463 A1 | 1/2003 | Li et al. |
| 2003/0012308 A1 | 1/2003 | Sampath et al. |
| 2003/0039317 A1* | 2/2003 | Taylor et al. ............... 375/295 |
| 2003/0045288 A1 | 3/2003 | Luschi et al. |
| 2003/0048856 A1 | 3/2003 | Ketchum et al. |
| 2003/0072395 A1 | 4/2003 | Jia et al. |
| 2003/0076812 A1 | 4/2003 | Benedittis |
| 2003/0078024 A1 | 4/2003 | Magee et al. |
| 2003/0095197 A1 | 5/2003 | Wheeler et al. |
| 2003/0099306 A1 | 5/2003 | Nilsson et al. |
| 2003/0103584 A1 | 6/2003 | Bjerke et al. |
| 2003/0112745 A1 | 6/2003 | Zhuang et al. |
| 2003/0119452 A1 | 6/2003 | Kim et al. |
| 2003/0123389 A1 | 7/2003 | Russell et al. |
| 2003/0125040 A1 | 7/2003 | Walton et al. |
| 2003/0128656 A1 | 7/2003 | Scarpa |
| 2003/0139194 A1 | 7/2003 | Onggosanusi et al. |
| 2003/0142732 A1 | 7/2003 | Moshavi et al. |
| 2003/0153360 A1 | 8/2003 | Burke et al. |
| 2003/0157954 A1 | 8/2003 | Medvedev et al. |
| 2003/0162519 A1 | 8/2003 | Smith et al. |
| 2003/0165189 A1* | 9/2003 | Kadous ............... 375/225 |
| 2003/0185311 A1 | 10/2003 | Kim |
| 2003/0186650 A1 | 10/2003 | Liu |
| 2003/0190897 A1 | 10/2003 | Lei et al. |
| 2003/0202492 A1 | 10/2003 | Akella et al. |
| 2003/0202612 A1 | 10/2003 | Halder et al. |
| 2003/0206558 A1 | 11/2003 | Parkkinen et al. |
| 2003/0235149 A1 | 12/2003 | Chan et al. |
| 2003/0235255 A1 | 12/2003 | Ketchum et al. |
| 2004/0005887 A1 | 1/2004 | Bahrenburg et al. |
| 2004/0017785 A1 | 1/2004 | Zelst |
| 2004/0037257 A1 | 2/2004 | Ngo |
| 2004/0042556 A1 | 3/2004 | Medvedev et al. |
| 2004/0052228 A1 | 3/2004 | Tellado et al. |
| 2004/0062192 A1 | 4/2004 | Liu et al. |
| 2004/0071104 A1 | 4/2004 | Boesel et al. |
| 2004/0071107 A1 | 4/2004 | Kats et al. |
| 2004/0076224 A1 | 4/2004 | Onggosanusi et al. |
| 2004/0081131 A1 | 4/2004 | Walton et al. |
| 2004/0082356 A1 | 4/2004 | Walton et al. |
| 2004/0085939 A1 | 5/2004 | Wallace et al. |
| 2004/0120411 A1 | 6/2004 | Walton et al. |
| 2004/0121730 A1 | 6/2004 | Kadous et al. |
| 2004/0136349 A1 | 7/2004 | Walton et al. |
| 2004/0151108 A1 | 8/2004 | Blasco Claret et al. |
| 2004/0151122 A1 | 8/2004 | Lau et al. |
| 2004/0156328 A1 | 8/2004 | Walton et al. |
| 2004/0160987 A1 | 8/2004 | Sudo et al. |
| 2004/0176097 A1 | 9/2004 | Wilson et al. |
| 2004/0179627 A1 | 9/2004 | Ketchum et al. |
| 2004/0184398 A1 | 9/2004 | Walton et al. |
| 2004/0198276 A1 | 10/2004 | Tellado et al. |
| 2004/0252632 A1 | 12/2004 | Bourdoux et al. |
| 2005/0002326 A1 | 1/2005 | Ling et al. |
| 2005/0047384 A1 | 3/2005 | Wax et al. |
| 2005/0047515 A1 | 3/2005 | Walton et al. |
| 2005/0088959 A1* | 4/2005 | Kadous ............... 370/208 |
| 2005/0099974 A1 | 5/2005 | Kats et al. |
| 2005/0120097 A1 | 6/2005 | Walton et al. |
| 2005/0128953 A1 | 6/2005 | Wallace et al. |
| 2005/0135284 A1 | 6/2005 | Nanda et al. |
| 2005/0135295 A1 | 6/2005 | Walton et al. |
| 2005/0135318 A1 | 6/2005 | Walton et al. |
| 2005/0147177 A1 | 7/2005 | Seo et al. |
| 2005/0174981 A1 | 8/2005 | Heath et al. |
| 2005/0185575 A1 | 8/2005 | Hansen et al. |
| 2005/0195915 A1 | 9/2005 | Raleigh et al. |
| 2005/0208959 A1 | 9/2005 | Chen et al. |
| 2005/0220211 A1 | 10/2005 | Shim et al. |
| 2005/0245264 A1 | 11/2005 | Laroia et al. |
| 2005/0276343 A1 | 12/2005 | Jones |
| 2006/0018247 A1 | 1/2006 | Driesen et al. |
| 2006/0018395 A1 | 1/2006 | Tzannes |
| 2006/0039275 A1 | 2/2006 | Walton et al. |
| 2006/0067417 A1 | 3/2006 | Park et al. |
| 2006/0072649 A1 | 4/2006 | Chang et al. |
| 2006/0077935 A1 | 4/2006 | Hamalainen et al. |
| 2006/0104196 A1 | 5/2006 | Wu et al. |
| 2006/0104340 A1 | 5/2006 | Walton et al. |
| 2006/0114858 A1* | 6/2006 | Walton et al. ............... 370/335 |
| 2006/0153237 A1 | 7/2006 | Hwang et al. |
| 2006/0159120 A1 | 7/2006 | Kim |
| 2006/0176968 A1 | 8/2006 | Keaney et al. |
| 2006/0183497 A1 | 8/2006 | Paranchych et al. |
| 2006/0209894 A1 | 9/2006 | Tzannes et al. |
| 2006/0209937 A1* | 9/2006 | Tanaka et al. ............... 375/219 |
| 2007/0177681 A1 | 8/2007 | Choi et al. |
| 2007/0274278 A1 | 11/2007 | Choi et al. |
| 2008/0069015 A1 | 3/2008 | Walton et al. |
| 2008/0267098 A1 | 10/2008 | Walton et al. |
| 2008/0267138 A1 | 10/2008 | Walton et al. |
| 2008/0285488 A1 | 11/2008 | Walton et al. |
| 2008/0285670 A1 | 11/2008 | Walton et al. |
| 2009/0291642 A1 | 11/2009 | Cozzo et al. |
| 2010/0067401 A1 | 3/2010 | Medvedev et al. |
| 2010/0119001 A1 | 5/2010 | Walton et al. |
| 2010/0142636 A1 | 6/2010 | Heath, Jr. et al. |
| 2010/0183088 A1 | 7/2010 | Inanoglu |
| 2010/0208841 A1 | 8/2010 | Walton et al. |
| 2010/0260060 A1 | 10/2010 | Abraham et al. |
| 2010/0271930 A1 | 10/2010 | Tong et al. |
| 2011/0096751 A1 | 4/2011 | Ma et al. |
| 2011/0235744 A1 | 9/2011 | Ketchum et al. |
| 2012/0140664 A1 | 6/2012 | Walton et al. |
| 2012/0176928 A1 | 7/2012 | Wallace et al. |
| 2012/0219093 A1 | 8/2012 | Jia et al. |
| 2013/0235825 A1 | 9/2013 | Walton et al. |
| 2013/0279614 A1 | 10/2013 | Walton et al. |
| 2014/0036823 A1 | 2/2014 | Ma et al. |

FOREIGN PATENT DOCUMENTS

| | | |
|---|---|---|
| CA | 2690247 | 10/2001 |
| CN | 1086061 | 4/1994 |
| CN | 1234661 | 11/1999 |
| CN | 1298266 A | 6/2001 |
| CN | 1308794 | 8/2001 |
| CN | 1314037 A | 9/2001 |
| CN | 1347609 A | 5/2002 |
| CN | 1469662 | 1/2004 |
| CN | 1489836 A | 4/2004 |
| CN | 1537371 | 10/2004 |
| DE | 19951525 A1 | 6/2001 |
| EP | 0755090 A1 | 1/1997 |
| EP | 0762701 | 3/1997 |
| EP | 0772329 | 5/1997 |
| EP | 0805568 A1 | 11/1997 |
| EP | 0869647 A2 | 10/1998 |
| EP | 0895387 A1 | 2/1999 |
| EP | 0929172 A1 | 7/1999 |
| EP | 0951091 A2 | 10/1999 |
| EP | 0991221 A2 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 | 9/2001 |
| EP | 1137217 | 9/2001 |
| EP | 1143754 A1 | 10/2001 |
| EP | 1170879 A1 | 1/2002 |

(56) References Cited

FOREIGN PATENT DOCUMENTS

| | | |
|---|---|---|
| EP | 1175022 A2 | 1/2002 |
| EP | 1182799 A2 | 2/2002 |
| EP | 1185001 | 3/2002 |
| EP | 1185015 | 3/2002 |
| EP | 1185048 A2 | 3/2002 |
| EP | 1207635 A1 | 5/2002 |
| EP | 1207645 A1 | 5/2002 |
| EP | 1223702 A1 | 7/2002 |
| EP | 1241824 | 9/2002 |
| EP | 1265411 | 12/2002 |
| EP | 1315311 A1 | 5/2003 |
| EP | 1379020 | 1/2004 |
| EP | 1387545 | 2/2004 |
| EP | 1416688 A1 | 5/2004 |
| EP | 1447934 A1 | 8/2004 |
| EP | 1556984 A2 | 7/2005 |
| GB | 2300337 | 10/1996 |
| GB | 2373973 A | 10/2002 |
| JP | 1132027 | 5/1989 |
| JP | 03104430 | 5/1991 |
| JP | 06003956 | 1/1994 |
| JP | 6501139 T | 1/1994 |
| JP | 8274756 A | 10/1996 |
| JP | 9135230 | 5/1997 |
| JP | 9266466 | 10/1997 |
| JP | 9307526 A | 11/1997 |
| JP | 09327073 | 12/1997 |
| JP | 9512156 | 12/1997 |
| JP | 10028077 | 1/1998 |
| JP | 10051402 A | 2/1998 |
| JP | 10084324 | 3/1998 |
| JP | 10209956 A | 8/1998 |
| JP | 10303794 A | 11/1998 |
| JP | 10327126 | 12/1998 |
| JP | 1141159 | 2/1999 |
| JP | 11069431 A | 3/1999 |
| JP | 11074863 A | 3/1999 |
| JP | 11163823 A | 6/1999 |
| JP | 11205273 | 7/1999 |
| JP | 11252037 A | 9/1999 |
| JP | 11317723 A | 11/1999 |
| JP | 2991167 | 12/1999 |
| JP | 2000068975 A | 3/2000 |
| JP | 2000078105 | 3/2000 |
| JP | 2000092009 A | 3/2000 |
| JP | 2001044930 A | 2/2001 |
| JP | 200186045 | 3/2001 |
| JP | 2001103034 A | 4/2001 |
| JP | 2001186051 A | 7/2001 |
| JP | 2001510668 A | 7/2001 |
| JP | 2001217896 | 8/2001 |
| JP | 2001231074 | 8/2001 |
| JP | 2001237751 | 8/2001 |
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002118534 A | 4/2002 |
| JP | 2002510932 A | 4/2002 |
| JP | 2002514033 A | 5/2002 |
| JP | 2002164814 | 6/2002 |
| JP | 2002176379 A | 6/2002 |
| JP | 2002204217 | 7/2002 |
| JP | 2002232943 A | 8/2002 |
| JP | 2003504941 | 2/2003 |
| JP | 2003198442 | 7/2003 |
| JP | 2003530010 | 10/2003 |
| JP | 2004266586 | 9/2004 |
| JP | 2004297172 | 10/2004 |
| JP | 2004535694 | 11/2004 |
| JP | 2005519520 | 6/2005 |
| JP | 2006504336 A | 2/2006 |
| JP | 2006504372 | 2/2006 |
| KR | 200011799 | 2/2000 |
| KR | 20010098861 | 11/2001 |
| KR | 1020020003370 | 1/2002 |
| KR | 20030085040 | 11/2003 |
| KR | 20060095576 A | 8/2006 |
| RU | 2015281 C1 | 6/1994 |
| RU | 2111619 C1 | 5/1998 |
| RU | 2134489 | 8/1999 |
| RU | 2139633 | 10/1999 |
| RU | 2141168 | 11/1999 |
| RU | 2146418 C1 | 3/2000 |
| RU | 2149509 | 5/2000 |
| RU | 2152132 | 6/2000 |
| RU | 2157592 | 10/2000 |
| RU | 2158479 C2 | 10/2000 |
| RU | 2168277 | 5/2001 |
| RU | 2168278 | 5/2001 |
| RU | 2197781 C2 | 1/2003 |
| RU | 2201034 C2 | 3/2003 |
| RU | 2335852 C2 | 10/2008 |
| TW | 419912 | 1/2001 |
| TW | 496620 | 7/2002 |
| TW | 503347 | 9/2002 |
| TW | 200300636 | 6/2003 |
| TW | 545006 B | 8/2003 |
| TW | 567689 | 12/2003 |
| TW | 567701 | 12/2003 |
| TW | 583842 B | 4/2004 |
| TW | I230525 | 4/2005 |
| TW | I263449 | 10/2006 |
| TW | I267251 B | 11/2006 |
| WF | WO9857472 | 12/1998 |
| WO | WO8607223 | 12/1986 |
| WO | WO9307684 A1 | 4/1993 |
| WO | WO9507578 | 3/1995 |
| WO | WO-9516319 A1 | 6/1995 |
| WO | 9521501 A1 | 8/1995 |
| WO | WO9530316 A1 | 11/1995 |
| WO | WO9532567 A1 | 11/1995 |
| WO | WO9622662 | 7/1996 |
| WO | WO9635268 | 11/1996 |
| WO | 9702667 | 1/1997 |
| WO | WO9719525 A1 | 5/1997 |
| WO | WO9736377 A1 | 10/1997 |
| WO | WO9809381 | 3/1998 |
| WO | WO9809395 | 3/1998 |
| WO | WO9824192 A1 | 6/1998 |
| WO | WO9826523 | 6/1998 |
| WO | WO9830047 A1 | 7/1998 |
| WO | WO9903224 | 1/1999 |
| WO | WO9914878 | 3/1999 |
| WO | WO9916214 | 4/1999 |
| WO | 9929049 A2 | 6/1999 |
| WO | WO9944379 A1 | 9/1999 |
| WO | 9952224 A1 | 10/1999 |
| WO | WO9957820 | 11/1999 |
| WO | WO0011823 A1 | 3/2000 |
| WO | WO0036764 A2 | 6/2000 |
| WO | WO0062456 | 10/2000 |
| WO | WO0105067 A1 | 1/2001 |
| WO | WO0126269 | 4/2001 |
| WO | 0163775 A2 | 8/2001 |
| WO | WO0169801 | 9/2001 |
| WO | WO0171928 | 9/2001 |
| WO | WO0176110 A2 | 10/2001 |
| WO | WO0180510 A1 | 10/2001 |
| WO | WO0182521 A2 | 11/2001 |
| WO | 0195531 A2 | 12/2001 |
| WO | WO0197400 | 12/2001 |
| WO | WO0201732 A2 | 1/2002 |
| WO | WO0203557 A1 | 1/2002 |
| WO | WO-0205506 | 1/2002 |
| WO | WO02015433 A1 | 2/2002 |
| WO | WO02025853 A2 | 3/2002 |
| WO | WO02060138 | 8/2002 |
| WO | WO02062002 A1 | 8/2002 |
| WO | WO02065664 | 8/2002 |
| WO | WO02069523 A1 | 9/2002 |
| WO | WO02069590 A1 | 9/2002 |
| WO | WO02073869 A1 | 9/2002 |

(56) References Cited

FOREIGN PATENT DOCUMENTS

| | | |
|---|---|---|
| WO | WO02078211 A2 | 10/2002 |
| WO | WO02082689 A2 | 10/2002 |
| WO | WO02088656 | 11/2002 |
| WO | WO02093784 A1 | 11/2002 |
| WO | WO02099992 | 12/2002 |
| WO | WO03010984 A1 | 2/2003 |
| WO | WO03010994 A1 | 2/2003 |
| WO | WO03019984 A1 | 3/2003 |
| WO | WO03028153 | 4/2003 |
| WO | WO03034646 A2 | 4/2003 |
| WO | WO03004714 A1 | 6/2003 |
| WO | WO03075479 | 9/2003 |
| WO | WO0402011 | 12/2003 |
| WO | WO0402047 | 12/2003 |
| WO | WO2004038985 A2 | 5/2004 |
| WO | WO2004038986 | 5/2004 |
| WO | WO2004039011 | 5/2004 |
| WO | WO2004039022 | 5/2004 |
| WO | WO2005041515 | 5/2005 |
| WO | WO2005043855 | 5/2005 |
| WO | WO2005046113 A2 | 5/2005 |

OTHER PUBLICATIONS

Wyglinski "Physical Layer Loading Algorithms for Indoor Wireless Multicarrier Systems" p. 109, Nov. 2004.*
International Search Report and Written Opinion—PCT/US2006/017992, International Search Authority—European Patent Office—Aug. 24, 2007.
Co-pending U.S. Appl. No. 60/421,309, filed Oct. 25, 2002.
Co-pending U.S. Appl. No. 60/421,428, filed Oct. 25, 2002.
G. Bauch, J. Hagenauer, "Smart Versus Dumb Antennas—Capacities and FEC Performance," IEEE Communications Letters, vol. 6, No. 2, pp. 55-57, Feb. 2002.
Partial European Search Report—EP10012069—Search Authority—The Hague—Nov. 29, 2011.
Supplementary European Search Report—EP06759443—Search Authority—Hague—Nov. 24, 2011.
3GPP2 TIA/EIA/IS-2000.2-A, "Physical Layer Standard for cdma2000: Standards for Spread Spectrum Systems," (Mar. 2000), Telecommunications Industry Association, pp. 1-446.
Alamouti, S.M., "A Simple Transmit Diversity Technique for Wireless Communications," IEEE Journal on Select Areas in Communications, vol. 16, No. 8, Oct. 1998, pp. 1451-1458.
Bingham, John A.C.: "Multicarrier Modulation for Data Transmission: An Idea Whose Time Has Come," IEEE Communications Magazine, pp. 5-14 (May 1990).
Chen, K.C. et al., "Novel Space-Time Processing of DS/CDMA Multipath Signal," IEEE 49th, Vehicular Technolgy Conference, Houston, Texas, May 16-20, 1999, pp. 1809-1813.
Choi, R. et al, "MIMO Transmit Optimization for Wireless Communication Systems," Proceedings of the First IEEE International workshops on Electronic Design, pp. 1-6, Piscataway, New Jersey, Jan. 29-31 (2002).
Chung, J. et al: "Multiple antenna systems for 802.16 systems." IEEE 802.16 Broadband Wireless Access Working Group <http://ieee802.org/16>, IEEE 802,16abc-01/31, Sept. 7, 2001, pp. 1-5.
Deneire, Luc, et al.: "A Low Complexity ML Channel Estimator For OFDM," Proc IEEE ICC (Jun. 2001), pp. 1461-1465.
Diggavi, S. et., "Intercarrier Interference in MIMO OFDM," IEEE International Conference on Communications, (Aug. 2002), Vol. 1, pp. 485-489, doi: 10.1109/ICC.2002.996901.
ETSI TS 101 761-1 v1.3.1, "Broadband Radio Access Networks (BRAN); HIPERLAN Type 2; Data Link Control (DLC) Layer; Part 1; Basic Data Transport Functions," ETSI Standards, European Telecommunications Standards institute BR (V131), pp. 1-88 (Dec. 2001).
European Search Report—EP11173875—Search Authority—Hague—Oct. 25, 2011.
Fujii, M.: "Pseudo-Orthogonal Multibeam-Time Transmit Diversity for OFDM-CDMA" pp. 222-226 (2002).
Gao, J. et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, (Sep. 24-28, 2002), IEEE Vehicular Technology Conference, pp. 199-203.
Gore, D. A., et al.: "Selecting an optimal set of transmit antennas for a low rank matrix channel," 2000 IEEE International Conference on Acoustics, Speech, and Signal Processing. Proceedings. (ICASSP). Istanbul, Turkey, June 5-9, 2000, New York, NY; IEEE, US, vol. 5 of 6, (Jun. 5, 2000), pp. 2785-2788, XP001035763, abstract.
Grunheid, R. et al., "Adaptive Modulation and Multiple Access for the OFDM Transmission Technique," Wireless Personal Communications 13: May 13, 2000, 2000 Kluwer Academic Publishers, pp. 4-13, XP000894156.
Hassibi, B. et al., "High Rate Codes That Are Linear in Space and Time," Lucent Technologies, 2002, pp. 1-55.
Haustein, T. et al.: "Performance of Mimo Systems with Channel Inversion," IEEE} 55th Vehicular Technology Conference, Birmingham, Alabama, May 6-9 (2002), pp. 35-39.
Hayashi, K. et al.: "A New Spatio-Temporal Equalization Method Based On Estimated Channel Response," Sep. 2001, IEEE Transactions on Vehicular Technology, vol. 50, No. 5, pp. 1250-1259.
Hong, D. K. et al.: "Robust Frequency Offset Estimation for Pilot Symbol Assisted Packet CDMA with MIMO Antenna Systems," IEEE Communications Letters, vol. 6, No. 6, pp.262-264, XP-001133262 (Jun. 2002).
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
Iserte, P., et al,, "Joint beamforming strategies in OFDM-MIMO systems," Acoustics, Speech, and Signal Processing, 1993. ICASSP-93. 1993 IEEE International Conference on , vol. 3, sections 2-3, Apr. 27-30, 1993, doi: 10.1109/ICASSP.2002.1005279.
Joham, M, et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.
Jongren, G. et al.: "Utilizing Quantized Feedback Information In Orthogonal Space-Time Block Coding," 2000 IEEE Global Telecommunications Conference, 2(4): 955-999, Nov. 27, 2000.
Kiessling, M. et al., "Short-term and long-term diagonalization of correlated MIMO channels with adaptive modulation" IEEE International Symposium on Personal, Indoor and Mobile Radio Communicatiors, vol. 2, Sep. 15, 2002, pp. 593-597.
Kousa M. et al., "Multichannel Adaptive System", IEEE Proceedings I. Solid-State & Electron Devices, Institution of Electrical Engineers. Stevenage, GB, vol. 140, No. 5, Part 1, Oct. 1, 1993, pp. 357-364, XP000403498, ISSN: 0956-3776.
Le Goff, S. et al; "Turbo-codes and high spectral efficiency modulation," IEEE International Conference on Communications, 1994. ICC '94, Supercomm/ICC '94, Conference Record, 'Serving Humanity Through Communications.' pp. 645-649, vol. 2, May 1-5, 1994, XP010126658, doi: 10.1109/ICC.1994.368804.
Lebrun G., et al., "MIMO transmission over a time varying TDD channel using SVD," Electronics Letters, 2001, vol. 37, pp. 1363-1364.
Li, Lihua, et al., "A practical space-frequency block coded OFDM scheme for fast fading broadband channels," 2002. The 13th IEEE International Symposium on Personal, Indoor and Mobile Radio communications, vol. 1, Sep. 15-18, 2002. pp. 212-216 vol. 1.
Li, Ye et. al., Simplified Channel Estimation for OFDM Systems with Multiple Transmit.
Antennas, IEEE Transactions on Wireless Communications, Jan. 2002, vol. 1, No. 1, pp. 67-75.
Miyashita, K. et al: "High data-rate transmission with eigenbeam-space division multiplexing (E-SDM) in a MIMO channel," VTC 2002-Fall. 2002 IEEE 56th. Vehicular Technology Conference Proceedings. Vancouver, Canada, Sep. 24-28, 2002, IEEE Vehicular Technology Conference, New York, NY: IEEE, US, vol. vol. 1 of 4. Conf. 56, (Sep. 24, 2002), pp. 1302-1306, XP010608639.
Office Action dated Aug. 13, 2008 for Australian Application Serial No. 2004223374, 2 pages.

(56) References Cited

OTHER PUBLICATIONS

Office Action dated Jun. 27, 2008 for Chinese Application Serial No. 200480011307.6, 3 pages.
Pautler, J. et al.; "On Application of Multiple-Input Multiple-Output Antennas to CDMA. Cellular Systems," IEEE 54th Vehicular Technology Conference Proceedings, Atlantic City, New Jersey, Oct. 7-11 (2001), pp. 1508-1512.
Sampath, H., et al., "Joint transmit and receive optimization for high data rate wireless communication using multiple antennas," Signals, Systems, and Computers, 1999. Conference Record of the Thirty-Third Asilomar Conference, Oct. 24, 1999, XP010373976, pp. 215-219, IEEE, Piscataway, NJ, US.
Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI: 10.1109/ACSSC.1996.600812, p. 35, col. 2, paragraph 4 through p. 36, col. 1.
Tarighat, A. et al. "Performance Analysis of Different Algorithms for cdma2000 Antenna Array System and a New Multi User Beamforming (MUB) Algorithm", Wireless Communications and Networking Conference, vol. 1, pp. 409-414, Sep. 23, 2000.
The Authoritative Dictionary of IEEE Standards Terms, Seventh Edition, IEEE Press: New York (Dec. 2000), p. 902.
Theon, S. et al.: "Improved Adaptive Downlink for OFDM/SDMA-Based Wireless Networks," IEEE VTS 53rd Vehicular Technology Conference, pgs. 707-711, Rhodes, Greece, May 6-9, (2001).
Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinki, Finland, Jun. 11-14 (2001).
Van Zelst, A. et al.: "Space Division Multiplexing (SDM) for OFDM Systems," IEEE 51st Vehicular Technology Conference Proceedings, pp. 1070-1074, Tokyo, Japan, May 15-18 (2000).
Vook F W et al., "Adaptive antennas for OFDM", Vehicular Technology Conference, vol. 1, May 18, 1998 (1998-05-181, -May 21, 1998, pp. 606-610, XP010287858, New York, NY, USA, IEEE, US DOI: 10.1109/VETEC.1998.686646 ISBN: 978-0-7803-4320-7.
Wales, S.W. "A mimo technique within the UTRA TDD standard," MIMO: Communications Systems from Concept to Implementations (Ref. No. 2001/175), IEE Seminar on, (Dec. 12, 2001), pp. 1-8., London, UK.
Warner, W. et al,: "OFDM/FM Frame Synchronization for Mobile Radio Data Communication", IEEE Transactions on Vehicular Technology, Aug. 1993, vol. 42, No. 3, pp. 302-313.
Wolniansky, P.W.; Foschini, G.J.; Golden, G.D.; Valenzuela, R.A.; "V-BLAST: an architecture for realizing very high data rates over the rich-scattering wireless channel," Signals, Systems, and Electronics, 1998. ISSSE 98. 1998 URSI International Symposium, pp. 295-300, (Sep. 29-Oct. 2, 1998), doi: 10.1109/ISSSE,1998.738086.
Wong, et al., "Multiuser OFDM With Adaptive Subcarrier, Bit, and Power Allocation," Oct. 1999, IEEE Journal on Selected Areas in Communications, vol. 17, No. 10, pp. 1747-1758. May 14, 2013.
Wong K. K,, et al., "Optimizing time and space MIMO antenna system for frequency selective fading channels," IEEE Journal on Selected Areas in Communications, vol. 19, No. 7, Jul. 2001, Sections II and III and V, 1396, pp. 1395-1407.
Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.
3 rd Generation Partnership Project (3GPP); Technical Specification Group (TSG); Radio Access Network (RAN); RF requirements f o r 1.28Mcps UTRA TDD option, 3GPP Standard; 3G TR 25.945, 3rd Generation Partnership Project (3GPP), Mobile Competence Centre; 650, Route Des Lucioles; F-06921 Sophia-Antipolis Cedex; France, No. V2.0.0, Dec. 20, 2000, pp. 1-144, XP050400193, [retreived on Dec. 20, 2000], p. 126.
3rd Generation Partnership Project; Technical Specification Group Radio Access Network; Radio Resource Control (RRC); Protocol Specifiation (Release 5 ), 3GPP Standard; 3GPP TS 25.331, 3rd Generation Partnership Project (3GPP), Mobile Competence Centre; 650, Route Des Lucioles; F-06921 Sophia-Antipolis Cedex; France, No. V5.2.0, Sep. 1, 2002, pp. 1-938, XP050367950, pp. 124, 358-p. 370.
"3rd Generation Partnership Project; Technical Specification Group Radio Access 6-18, Network; Physical channels and mapping of 21-24 transport channels onto physical channels (TDD) (Release 5 )" , 3GPP Standard; 3GPP TS 25.221, 3rd Generation Partnership Project (3GPP), Mobile Competence Centre; 650, Route Des Lucioles; F-06921 Sophia-Antipolis Cedex; France, No. V5.2.0, Sep. 1, 2002, pp. 1-97, XP050366967.
Catreux S., et al., "Simulation results for an interference-limited multiple input multiple output cellular system". Global Telecommmunications letters. IEEE: U.S.A. Novermber, 2000. vol. 4(11), pp. 334-336.
Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.
Co-pending U.S. Appl. No. US07/624,118, filed Dec. 7, 1990.
Harada H., et al., "An OFDM-Based Wireless ATM Transmission System Assisted by a Cyclically ExtendedPN Sequence for Future Broad-BandMobile Multimedia Communications", IEEE Transactions on Vehicular Technology, IEEE Service Center, Piscataway, NJ, US, vol. 50, No. 6, Nov. 1, 2001, XP011064321, ISSN: 0018-9545.
Heath et al., "Multiuser diversity for MIMO wireless systems with linear receivers", Conference Record of the 35th Asilomar Conference on Signals, Systems, & Computers, Nov. 4, 2001, pp. 1194-1199, vol. 2, IEEE, XP010582229, DOI: 10.1109/ACSSC.2001. 987680, ISBN: 978-0-7803-7147-7.
Louvigne J.C., et al., "Experimental study of a real-time calibration procedure of a CDMA/TDD multiple antenna terminal," IEEE Antennas and Propagation Society International Symposium, 2002 Digest.Aps.San Antonio, TX, Jun. 16-21, 2002, vol. 2, Jun. 16, 2002, pp. 644-647, XP010591780, DOI: 10.1109/Aps.2002.1016729, ISBN: 978-0-7803-7330-3.
Nogueroles R., et al., "Performance of a random OFDMA system for mobile communications", Broadband Communications, 1998. Accessing, Transmission, Networking. Proceedings. 1998 International Zurich Seminar on Zurich, Switzerland Feb. 17-19, 1998, New York , NY, USA, IEEE, US, Feb. 17, 1998, pp. 37-43, XP010277032 , DOI: 10.1109/IZSBC.1998.670242 ISBN: 978-0-7803-3893-7, p. 1 - p. 2.
Sakaguchi et al, "Comprehensive Calibration for MIMO System", International Symposium on Wireless Personal Multimedia Communications, IEEE, vol. 2, Oct. 27, 2002, pp. 440-443.
Sampath et al., "A Fourth-Generation MIMO-OFDM Broadband Wireless System: Design, Performance and Field Trial Results", IEEE Communications Magazine, Sep. 1, 2002, pp. 143-149, vol. 40, No. 9, IEEE Service Center, XP011092922, ISSN: 0163-6804, DOI: 10.1109/MCOM.2002.1031841.
Varanasi M.K, et al., "Optimum decision feedback multiuser equalization with successive decoding achieves the total capacity of the Gaussian multiple-access channel", Signals, Systems & Computers, 1997. Conference Record of the Thirty-First Asilomar Conference on Pacific Grove, CA, USA Nov. 2-5, 1997, Los Alamitos, CA, USA, IEEE Comput. Soc, US, vol. 2, Nov. 2, 1997, pp. 1405-1409 , XP010280667, DOI: 10.1109/ACSSC.1997. 679134 ISBN: 978-0-8186-8316-9 * pp. 1,3,5; figures 1,3 *.
Yamamura, T et al., "High Mobility OFDM transmission system by a new channel estimation and ISI cancellation scheme using characteristics of pilot symbol inserted OFDM signal"., Vehicular Technology Conference, vol. 1, Sep. 19, 1999-Sep. 22, 1999, pp. 319-323, XP010352958 IEEE, Piscataway, NJ, USA, ISBN: 0-7803-5435-4.
Editor: 3GPP Draft; 3rd Generation Partnership Project (3GPP), Technical Specification Group (TSG) Radio Access Network (RAN); Working Group 4(WG4); base Station conformance and testing", TS 25.141 V0.1.1 (May 1999)", R4-99349, Mobile Competence Centre; 650, Route Des Lucioles; F-06921 Sophia-Antipolis Cedex; France, vol. RAN WG4, no.Miami; 20011024, Oct. 24, 2001, XP050166323.

(56) References Cited

OTHER PUBLICATIONS

EPO Communication pursuant to Article 94(3) EPC issued by the European Patent Orifice for Application No. 10174926.5 dated Aug. 1, 2013.
EPO Communication pursuant to Article 94(3) EPC issued by the European Patent Orffice for Application No. 10174932.3 dated Jul. 30, 2013.
Lal D et al: "A novel MAC layer protocol for space division multiple access in wireless ad hoc networks", Computer Communications and Networks, 2002 Proceedings, Eleventh International Conference on Oct. 14, 2002, pp. 614-619.
Technical Search Report issued by the Taiwan Patent Office for TW Application No. 098143050, dated Aug. 2, 2013.
Japanese Office Action; Application No. 2013-097793; May 7, 2014.
Japanese Office Action Translation; Application No. 2013-097793; May 7, 2014 (provided by JPO Counsel).

* cited by examiner

RATE SELECTION WITH MARGIN SHARING

PRIORITY CLAIM

This application is a divisional application of, and claims the benefit of priority from, U.S. patent application Ser. No. 11/128,698, entitled "Rate Selection with Margin Sharing" and filed May 12, 2005, which is assigned to the assignee of this application and which is fully incorporated herein by reference for all purposes.

BACKGROUND

1. Field

The present invention relates generally to communication, and more specifically to techniques for selecting rates for data transmission in a communication system.

2. Background

In a communication system, a transmitter may transmit multiple streams of data via multiple transmission channels to a receiver. The transmission channels may be formed in the spatial domain, frequency domain, time domain, or a combination thereof. For example, the multiple transmission channels may correspond to different spatial channels in a multiple-input multiple-output (MIMO) communication system, different frequency subbands in an orthogonal frequency division multiplex (OFDM) communication system, or different time slots in a time division multiplex (TDM) communication system.

The transmission channels may experience different channel conditions (e.g., different fading, multipath, and interference effects) and may achieve different signal-to-noise ratios (SNRs). The SNR of a transmission channel determines its transmission capability, which is typically quantified by a particular data rate that may be reliably transmitted on the transmission channel. If the SNR varies from transmission channel to transmission channel, then the supported data rate would also vary from channel to channel. Furthermore, if the channel conditions vary with time, then the data rates supported by the transmission channels would also vary with time.

A major challenge in a coded communication system is selecting the appropriate rates to use for the multiple data streams based on the channel conditions. As used herein, a "rate" may indicate a particular data rate or information bit rate, a particular coding scheme, a particular modulation scheme, and so on to use for a data stream. The rate selection should maximize the overall throughput for the multiple transmission channels while meeting certain quality objectives, which may be quantified by a target packet error rate (PER).

There is therefore a need in the art for techniques to select suitable rates for data transmission on multiple transmission channels.

SUMMARY

Techniques for performing rate selection with margin sharing are described herein. According to an embodiment of the invention, a method is provided in which SNR estimates are initially determined for multiple data streams. Rates are then selected for the data streams based on the SNR estimates and such that at least one data stream has negative SNR margin, each remaining data stream has a non-negative SNR margin, and the total SNR margin for all data streams is non-negative.

According to another embodiment, an apparatus is described which includes a channel estimator and a controller. The channel estimator determines SNR estimates for multiple data streams. The controller selects rates for the data streams based on the SNR estimates and such that at least one data stream has negative SNR margin, each remaining data stream has a non-negative SNR margin, and the total SNR margin for all data streams is non-negative.

According to yet another embodiment, an apparatus is described which includes means for determining SNR estimates for multiple data streams and means for selecting rates for the data streams based on the SNR estimates and such that at least one data stream has negative SNR margin, each remaining data stream has a non-negative SNR margin, and the total SNR margin for all data streams is non-negative.

According to yet another embodiment, processor readable media is provided for storing instructions operable in an apparatus to obtain SNR estimates for multiple data streams and to select rates for the data streams based on the SNR estimates and such that at least one data stream has negative SNR margin, each remaining data stream has a non-negative SNR margins, and the total SNR margin for all data streams is non-negative.

According to yet another embodiment, a method is provided in which an SNR estimate is initially determined for each of multiple transmission channels usable for data transmission. The total SNR margin is then determined for each of multiple rate combinations based on the SNR estimates for the transmission channels. Each rate combination is associated with a specific number of data streams to transmit, a specific rate for each data stream, and a specific overall throughput. A rate combination is selected from among the multiple rate combinations based on the total SNR margins and the overall throughputs for these rate combinations.

According to yet another embodiment, an apparatus is described which includes a channel estimator and a controller. The channel estimator determines an SNR estimate for each of multiple transmission channels usable for data transmission. The controller determines the total SNR margin for each of multiple rate combinations based on the SNR estimates for the transmission channels and selects a rate combination from among the multiple rate combinations based on the total SNR margins and the overall throughputs for these rate combinations.

According to yet another embodiment, an apparatus is described which includes means for determining an SNR estimate for each of multiple transmission channels usable for data transmission, means for determining the total SNR margin for each of multiple rate combinations based on the SNR estimates for the transmission channels, and means for selecting a rate combination from among the multiple rate combinations based on the total SNR margins and the overall throughputs for these rate combinations.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The rate selection with margin sharing techniques described herein may be used for various communication systems with multiple transmission channels. For example, these techniques may be used for a MIMO system, an OFDM-based system, a TDM system, a MIMO system that utilizes OFDM (i.e., a MIMO-OFDM system), and so on. A MIMO system employs multiple (T) transmit antennas at a transmitter and multiple (R) receive antennas at a receiver for data transmission. A MIMO channel formed by the T transmit antennas and R receive antennas may be decomposed into S spatial channels, where S≤min {T, R}. S transmission channels may be formed with the S spatial channels. An OFDM system effectively partitions the overall system bandwidth into multiple (K) orthogonal subbands, which are also called tones, subcarriers, bins, and frequency channels. Each subband is associated with a respective carrier that may be modulated with data. K transmission channels may be formed with the K subbands. A MIMO-OFDM system has S spatial channels for each of the K subbands. Up to S·K transmission channels may be formed with the spatial channels of the subbands in the MIMO-OFDM system. A TDM system may transmit data in frames, where each frame may have multiple (Q) time slots. Q transmission channels may be formed for the Q time slots in each frame.

In general, multiple transmission channels may be formed in various manners. For clarity, much of the following description is for a MIMO-OFDM system, and each transmission channel may correspond to a wideband spatial channel (described below). Each transmission channel may be used to send one data stream.

Figure 1:
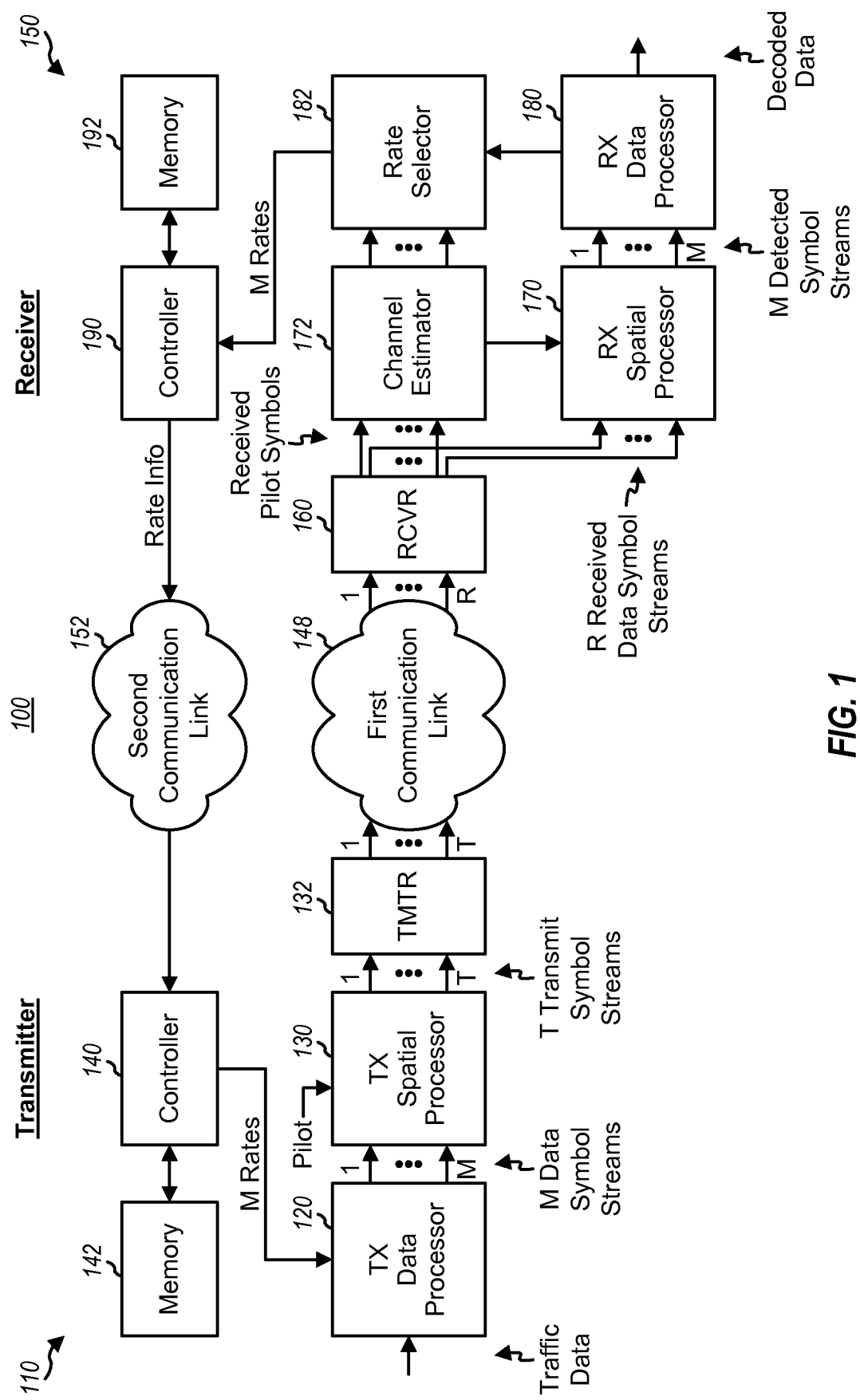
FIG. 1 shows a transmitter and a receiver in a communication system.

FIG. 1 shows a diagram of a transmitter 110 and a receiver 150 in a multi-channel communication system 100. At transmitter 110, a TX data processor 120 receives traffic data, processes (e.g., encodes, interleaves, and symbol maps) the traffic data in accordance with M rates from a controller 140, and generates M data symbol streams, where M≥1. As used herein, a data symbol is a modulation symbol for traffic/packet data, a pilot symbol is a modulation symbol for pilot (which is data that is known a priori by both the transmitter and receiver), a modulation symbol is a complex value for a point in a signal constellation for a modulation scheme (e.g., M-PSK or M-QAM), and a symbol is any complex value. A TX spatial processor 130 receives and multiplexes the M data symbol streams with pilot symbols, performs spatial processing on the data and pilot symbols (if applicable), and provides T transmit symbol streams.

A transmitter unit (TMTR) 132 processes the T transmit symbol streams and generates T modulated signals, which are transmitted from T antennas and via a first communication link 148. Communication link 148 distorts the modulated signals with a channel response and further degrades the modulated signals with additive white Gaussian noise (AWGN) and possibly interference from other transmitters.

At receiver 150, R antennas receive the transmitted signals and provide R received signals to a receiver unit (RCVR) 160. Receiver unit 160 conditions and digitizes the R received signals and further processes the samples in a manner complementary to the processing performed by transmitter unit 132. Receiver unit 160 provides received pilot symbols to a channel estimator 172 and R streams of received data symbols to a receive (RX) spatial processor 170. Channel estimator 172 derives a channel estimate for communication link 148 and provides the channel estimate to RX spatial processor 170. RX spatial processor 170 performs receiver spatial processing (or spatial matched filtering) on the R received data symbol streams with the channel estimate and provides M detected symbol streams, which are estimates of the M data symbol streams sent by transmitter 110. An RX data processor 180 processes (e.g., symbol demaps, deinterleaves, and decodes) the M detected symbol streams in accordance with the M rates selected for these streams and provides decoded data, which is an estimate of the traffic data sent by transmitter 110. RX data processor 180 may further provide decoding results (e.g., the status of each received packet and/or decoder metrics) to a rate selector 182.

For rate control, channel estimator 172 may process the received pilot symbols (and possibly the detected data symbols) and determine SNR estimates for the M streams. Rate selector 182 receives the SNR estimates and the decoding results, selects a suitable rate for each stream, and provides M selected rates for the M streams to a controller 190. Controller 190 sends rate information (e.g., the M selected rates) and possibly other information (e.g., acknowledgments for received packets) via a second communication link 152 to transmitter 110. Controller 140 at transmitter 110 receives the rate information and provides the M rates to TX data processor 120. FIG. 1 shows the rate selection being performed by receiver 150. In general, the rate selection may be performed by receiver 150, transmitter 110, or both the receiver and transmitter.

For the MIMO-OFDM system, the MIMO channel between the transmitter and the receiver may be characterized by a set of K channel response matrices, $\underline{H}(k)$ for $k=1, \ldots, K$. Each channel response matrix $\underline{H}(k)$ has a dimension of R×T and contains a complex gain between each transmit antenna and each receive antenna for subband k. Each matrix $\underline{H}(k)$ includes S spatial channels, where S≤min {T, R}. S orthogonal spatial channels (or eigenmodes) may be obtained for each subband k by decomposing $\underline{H}(k)$, as described below. In any case, up to S wideband spatial channels may be formed for the MIMO channel, where each wideband spatial channel includes one spatial channel for each of the K subbands. For example, each wideband spatial channel may correspond to the K subbands of one transmit antenna. As another example, each wideband spatial channel may include one eigenmode for each of the K subbands. Each wideband spatial channel may be used as a transmission channel.

The frequency response of each transmission channel m may be given by $h_m(k)$ for $k=1, \ldots, K$, where $h_m(k)$ is the complex channel gain for subband k of transmission channel m. For simplicity, it is assumed that $h_m(k)$ is constant across subband k. The received SNR for each subband of each transmission channel may be expressed as:

$$\gamma_m(k) = 10\log_{10}\left(P_m(k) \cdot \frac{|h_m(k)|^2}{N_0}\right), \quad \text{for} \qquad \text{Eq (1)}$$

$$k = 1, \ldots, K \text{ and}$$

$$m = 1, \ldots, S,$$

where $P_m(k)$ is the transmit power used for subband k of transmission channel m;

$N_0$ is the noise variance at the receiver; and $\gamma_m(k)$ is the received SNR for subband k of transmission channel m.

Equation (1) shows a simple expression for received SNR. In general, a received SNR expression may include terms for various factors. For example, in a MIMO system, the received SNR is dependent on the spatial processing performed by the transmitter and the receiver, as described below. For simplicity, the noise variance $N_0$ is assumed to be constant across the K subbands. The received SNR in equation (1) is given in units of decibel (dB). All of the SNR computation described below is also in units of dB unless noted otherwise.

Figure 2:
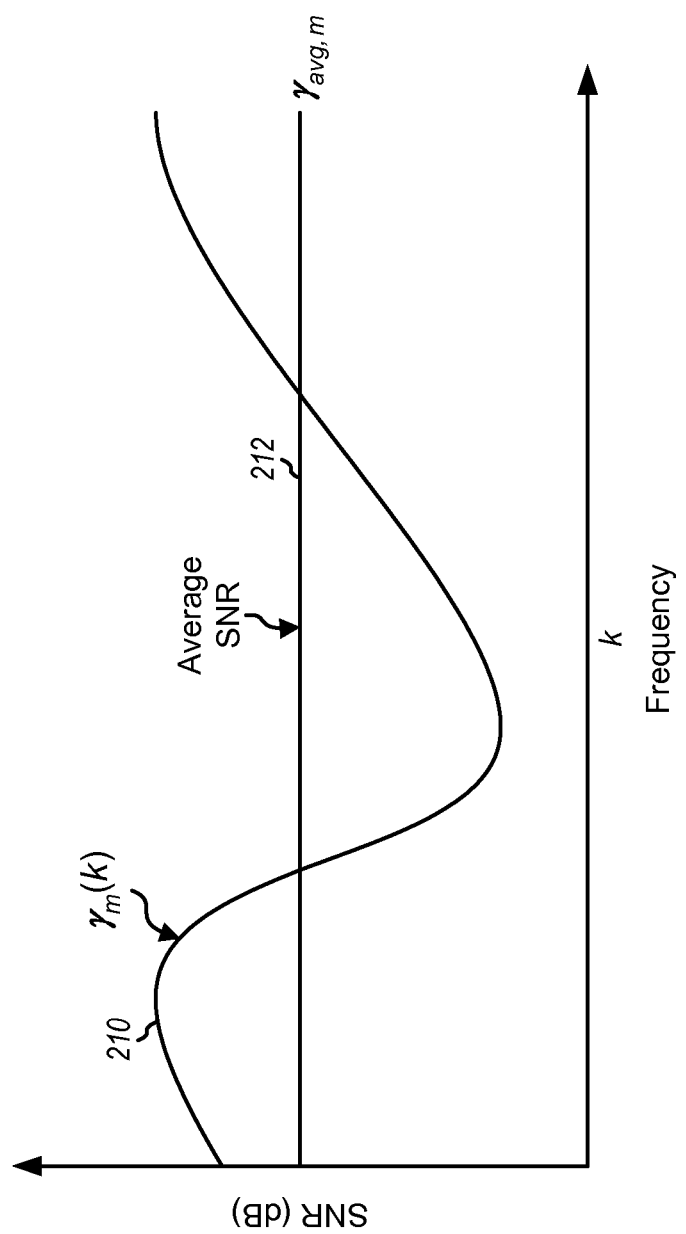
FIG. 2 shows a plot of received SNR versus frequency for a transmission channel.

FIG. 2 shows an exemplary plot 210 of the received SNR for a transmission channel with frequency selective fading. For a multipath channel, the channel gains $h_m(k)$ vary across the K subbands, and different received SNRs are achieved for different subbands, as shown by plot 210. An average SNR may be determined for the received SNRs of all subbands, as shown by line 212.

The transmitter may transmit one data stream on each of M transmission channels, where S≥M≥1. The number of data streams to transmit may be selected based on various factors such as the channel conditions, the achievable overall throughput, and so on. The rates for the M data streams may be selected in various manners. In general, the rate control with margin sharing techniques may be used for (1) a system with independent rate per stream, whereby the rate for each stream can be independently selected, and (2) a system with a vector-quantized rate set, whereby only certain combinations of rates are allowed.

Figure 3:
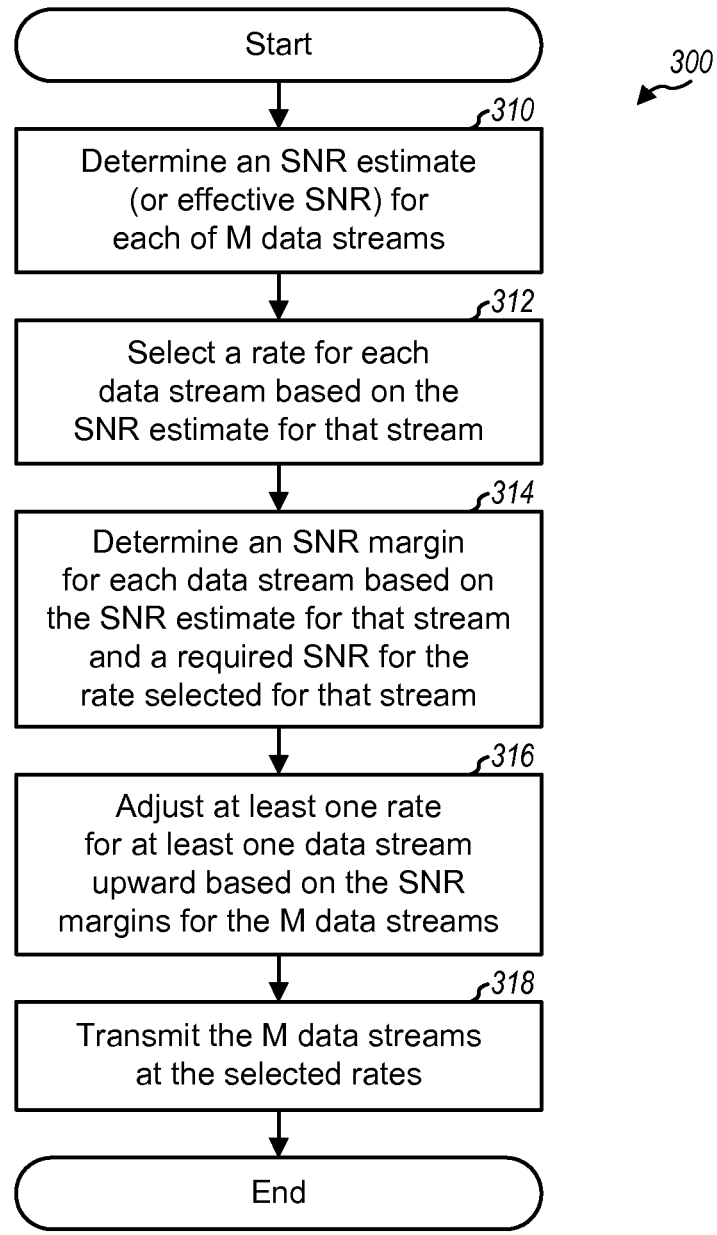
FIG. 3 shows a rate selection process for independent rate per stream.

FIG. 3 shows a process 300 for selecting the rates for M data streams for a system with independent rate per stream. Initially, an SNR estimate (which is also called an effective SNR) is obtained for each of the M data streams (block 310). A rate is then selected for each data stream based on the SNR estimate for that stream (block 312). An SNR margin is determined for each data stream based on the SNR estimate for that stream and a required SNR for the rate selected for that stream (block 314). At least one rate for at least one data stream is adjusted upward based on the SNR margins for the M data streams, if possible, such that at least one stream has negative SNR margin, the remaining streams have non-negative SNR margins, and the total SNR margin for all M streams is non-negative (block 316). The M data streams are then transmitted at the rates selected for these steams, where each rate may or may not have been adjusted upward via margin sharing (block 318). The blocks in FIG. 3 are described in further detail below.

The rate for each data stream may be selected based on the received SNRs for the transmission channel used to send that data stream. An embodiment for selecting the rate for each data stream (for blocks 310 and 312) is described below. For this embodiment, the received SNRs for all of the subbands of each transmission channel are first determined, e.g., based on the received pilot symbols.

The average SNR for each data stream/transmission channel may be computed as:

$$\gamma_{avg,m} = \frac{1}{K} \cdot \sum_{k=1}^{K} \gamma_m(k), \quad \text{for} \qquad \text{Eq (2)}$$

$$m = 1, \ldots, M,$$

where $\gamma_{avg,m}$ is the average SNR for data stream m, in units of dB.

The variance of the received SNRs for each data stream may be computed as:

$$\sigma_{snr,m}^2 = \frac{1}{(K-1)} \cdot \sum_{k=1}^{K} (\gamma_m(k) - \gamma_{avg,m})^2, \quad \text{for} \qquad \text{Eq (3)}$$

$$m = 1, \ldots, M,$$

where $\sigma_{snr,m}^2$ is the SNR variance for data stream m.

The effective SNR for each data stream may be computed as:

$$SNR_{eff}(m) = \gamma_{avg,m} - \gamma_{bo,m} \text{ for } m=1,\ldots,M, \qquad \text{Eq (4)}$$

where $\gamma_{bo,m}$ is a back-off factor for data stream m; and $SNR_{eff}(m)$ is the effective SNR (or SNR estimate) for data stream m.

The back-off factor $\gamma_{bo,m}$ is used to account for various factors such as variability in the received SNRs across a transmission channel. The back-off factor may be a function of the average SNR and the SNR variance, or $\gamma_{bo,m}=F(\gamma_{avg,m}, \sigma_{snr,m}^2)$. For example, the back-off factor may be defined as: $\gamma_{os,m}=K_{bo}\cdot\sigma_{snr,m}^2$, where Kbo is a constant. The back-off factor may also be defined based on system specific factors such as the diversity, coding schemes, interleaving schemes, packet sizes, and so on used for the data streams.

The system may support a specific set of rates. Each supported rate is associated with a particular minimum SNR required to achieve the desired level of performance (e.g., 1% PER for a non-fading, AWGN channel). A look-up table may store the supported rates and the required SNR for each supported rate. The effective SNR for each data stream may be compared against the required SNRs for the supported rates. The supported rate with the highest data rate and a required SNR that is less than or equal to the effective SNR is then selected for the data stream.

Table 1 lists an exemplary set of 14 rates supported by the system, which are given rate indices 0 through 13. Each rate is associated with a specific spectral efficiency, a specific code rate, a specific modulation scheme, and a specific required SNR. The spectral efficiency refers to the data rate (or information bit rate) normalized by the system bandwidth, and is given in units of bits per second per Hertz (bps/Hz). The code rate and the modulation scheme for each rate in Table 1 are for a specific system design. The null rate with index 0 has a zero data rate (or no data transmission). For each non-null rate with a non-zero data rate, the required SNR is obtained based on the specific system design (i.e., the code rate, interleaving scheme, modulation scheme, and so on used by the system for that rate) and for an AWGN channel. The required SNR may be obtained by computation, computer simulation, empirical measurements, and so on, as is known in the art. For each non-null rate, the SNR gap is the difference between the required SNR for that rate and the required SNR for the next higher rate. Since the rate with index 13 is the highest supported rate, its SNR gap is set to infinity or some other large value.

TABLE 1

| Rate Index | Spectral Efficiency (bps/Hz) | Code Rate | Modulation Scheme | Required SNR (dB) | SNR Gap (dB) |
|---|---|---|---|---|---|
| 0 | 0.0 | — | — | — | — |
| 1 | 0.25 | 1/4 | BPSK | −1.8 | 3.0 |
| 2 | 0.5 | 1/2 | BPSK | 1.2 | 3.0 |
| 3 | 1.0 | 1/2 | QPSK | 4.2 | 2.6 |
| 4 | 1.5 | 3/4 | QPSK | 6.8 | 3.3 |
| 5 | 2.0 | 1/2 | 16 QAM | 10.1 | 1.6 |
| 6 | 2.5 | 5/8 | 16 QAM | 11.7 | 1.5 |
| 7 | 3.0 | 3/4 | 16 QAM | 13.2 | 3.0 |
| 8 | 3.5 | 7/12 | 64 QAM | 16.2 | 1.2 |
| 9 | 4.0 | 2/3 | 64 QAM | 17.4 | 1.4 |
| 10 | 4.5 | 3/4 | 64 QAM | 18.8 | 1.2 |
| 11 | 5.0 | 5/6 | 64 QAM | 20.0 | 4.2 |
| 12 | 6.0 | 3/4 | 256 QAM | 24.2 | 2.1 |
| 13 | 7.0 | 7/8 | 256 QAM | 26.3 | ∞ |

M rates may be initially selected for the M data streams as described above and denoted as Rm for m=1, . . . , M. In the following description, rate Rm and rate index Rm are used interchangeably. The required SNR for the rate initially selected for each data stream is less than or equal to the effective SNR for that stream. Each data stream thus has a non-negative SNR margin, which may be expressed as:

$$SNR_{margin}(m) = SNR_{\mathit{eff}}(m) - SNR_{req}(R_m), \text{ for } m=1, \ldots, M \quad \text{Eq (5)}$$

where
$R_m$ is the rate initially selected for data stream m;
$SNR_{req}(R_m)$ is the required SNR for rate $R_m$; and
$SNR_{margin}(m)$ is the SNR margin for data stream m.

The total SNR margin for all M data streams may be expressed as:

$$SNR_{\text{total\_margin}} = \sum_{m=1}^{M} SNR_{margin}(m). \quad \text{Eq (6)}$$

The amount of SNR margin that may be passed from any one stream to other stream(s) may be limited to a predetermined maximum value, e.g., $SNR_{margin}(m) \leq SNR_{margin}^{max} = 2$ dB. This may be achieved by limiting $SNR_{margin}(m)$ for each stream m in equation (6) to be within $SNR_{margin}^{max}$. $SNR_{margin}^{max}$ may be fixed for all streams or may be a function of rate, code rate, modulation scheme, stream index, and so on, which may be different for each stream. Limiting $SNR_{margin}(m)$ can reduce the variation in the SNR margins for the M streams. The total SNR margin may also be limited to another predetermined maximum value, e.g., $SNR_{total\_margin} \leq SNR_{total\_margin}^{max} = 6$ dB. The amount of SNR that may be reallocated to any one stream is then limited to $SNR_{total\_margin}^{max}$. This ensures that no stream will be sent at a rate with a required SNR that is excessively above the effective SNR for that stream. In general, the amount of SNR that may be reallocated to any one stream may be limited to $SNR_{re-allo}^{max}$, which is a suitably selected value that may be equal to or lower than $SNR_{total\_margin}^{max}$. $SNR_{re-allo}^{max}$ may be a fixed value or a function of rate, code rate, modulation scheme, stream index, and so on.

The transmitter may encode the traffic data using a single base code to generate code bits, then parse the code bits into M streams, and further process (e.g., puncture and symbol map) the code bits for each stream in accordance with the rate selected for that stream, as described below. The receiver may perform the complementary processing, reassemble the detected symbols for the M streams, and decode the reassembled detected symbols. A sequence/packet of detected symbols to be decoded at the receiver may consist of groups of detected symbols that are generated with different rates. The outcome of each decoded bit is typically affected by the received SNRs for adjacent and nearby detected symbols. If the detected symbols for the M streams are decoded together, then the SNR margins for these streams may be shared among the streams in order to achieve a higher overall throughput. The margin sharing reallocates the total SNR margin with the goal of achieving a higher rate on at least one stream. Several embodiments of margin sharing are described below.

Figure 4:
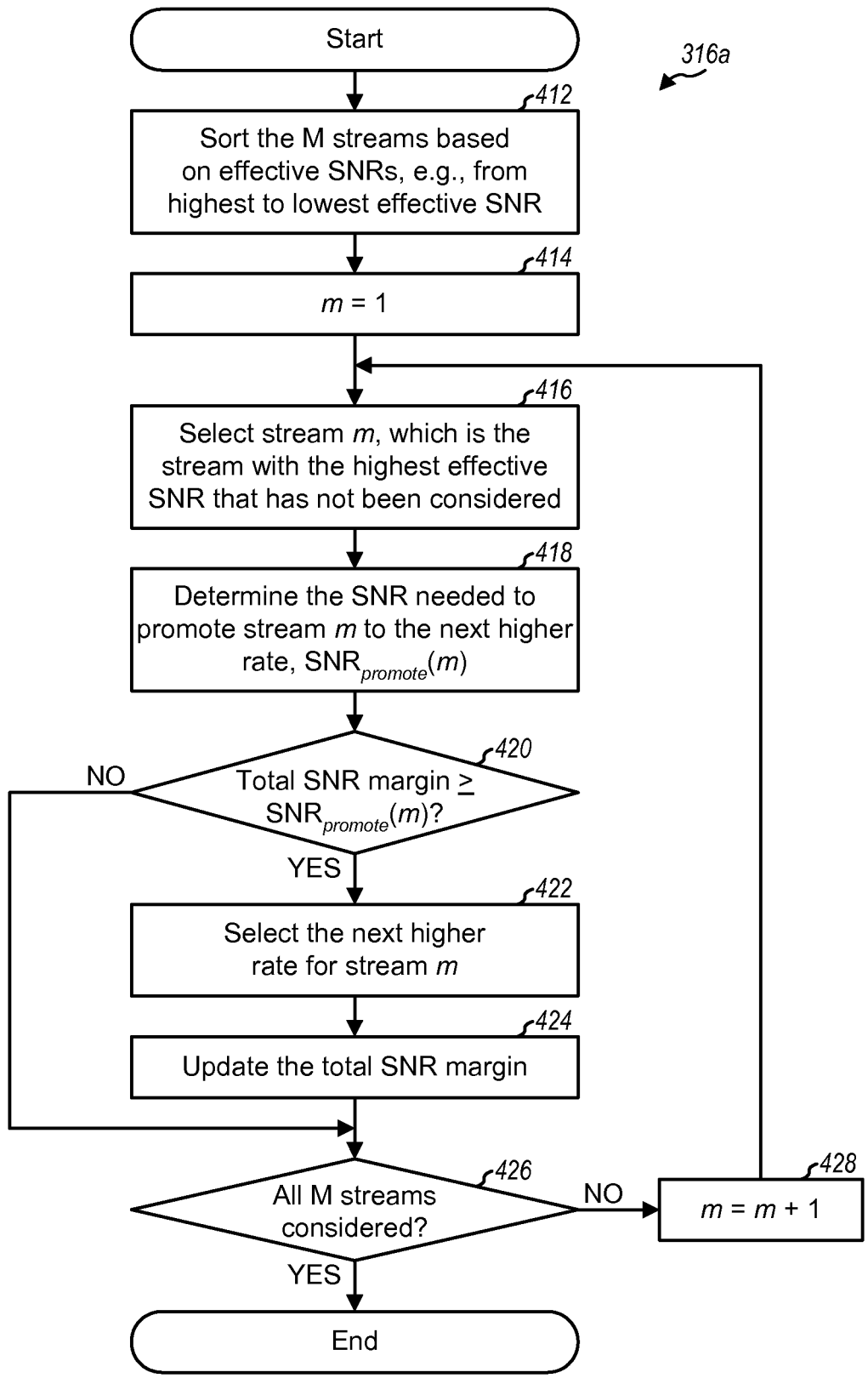
FIG. 4 shows a process for performing stream-ordered margin sharing.

FIG. 4 shows a process 316a for performing stream-ordered margin sharing, which is a first embodiment of margin sharing for a system with independent rate per stream. Process 316a may be used for block 316 in FIG. 3. For this embodiment, the total SNR margin is reallocated to the M streams in a sequential order based on their effective SNRs. Initially, the M streams are sorted based on their effective SNRs, with the first stream having the highest effective SNR and the last stream having the lowest effective SNR (block 412). Stream index m is initialized to 1 (block 414).

Stream m, which is the stream with the highest effective SNR that has not been considered, is selected (block 416). The SNR needed to promote stream m to the next higher rate is determined (block 418), as follows:

$$SNR_{promote}(m) = \begin{cases} SNR_{gap}(R_m) & \text{if } R_{max} \geq R_m > R_{min}, \\ SNR_{req}(R_m+1) - SNR_{\mathit{eff}}(m) & \text{if } R_m = R_{min}, \end{cases} \quad \text{Eq (7)}$$

where Rmin is the lowest supported rate, which is rate index 0 in Table 1;
Rmax is the highest supported rate, which is rate index 13 in Table 1; and
$SNR_{promote}(m)$ is the SNR needed to promote stream m to the next higher rate assuming that the SNR margin on stream m has been removed.

If the effective SNR for stream m is less than −1.8 dB, then the null rate Rmin is initially selected for stream m. The SNR to promote stream m to the lowest non-null rate with index 1 is equal to the difference between the required SNR for rate index 1 and the effective SNR for stream m. If the highest supported rate Rmax is initially selected for stream m, then setting $SNR_{promote}(m)$ to infinity or a large value ensures that the total SNR margin will not be sufficient to promote stream m.

A determination is then made whether the total SNR margin is greater than or equal to the SNR needed to promote stream m to the next higher rate (block 420). If the answer is 'Yes', then the next higher rate is selected for stream m (block 422), and the total SNR margin is updated (block 424), as follows:

$$SNR_{total\_margin} = SNR_{total\_margin} - SNR_{promote}(m) \quad \text{Eq (8)}$$

After block 424, and also if the answer is 'No' for block 420, a determination is made whether all M streams have been considered (block 426). If the answer is 'No', then stream index m is incremented (block 428), and the process returns to block 416 to consider the stream with the next lower effective SNR. Otherwise, if all M streams have been considered, then the process terminates. Although not shown in FIG. 4, the process may also terminate if the total SNR margin is zero or a small value that cannot promote any of the remaining streams.

For the first embodiment of margin sharing shown in FIG. 4, the M streams are ordered from highest to lowest effective SNRs and are then considered one at a time and in a sequential order starting with the stream having the highest effective SNR. For a second embodiment of margin sharing, which is also called reverse stream-ordered margin sharing, the M streams are ordered from lowest to highest effective SNRs and are then considered one at a time and in a sequential order starting with the stream having the lowest effective SNR. The second embodiment may be implemented as shown in FIG. 4, albeit with the M streams sorted in increasing order of effective SNRs (instead of decreasing order of effective SNRs).

Figure 5:
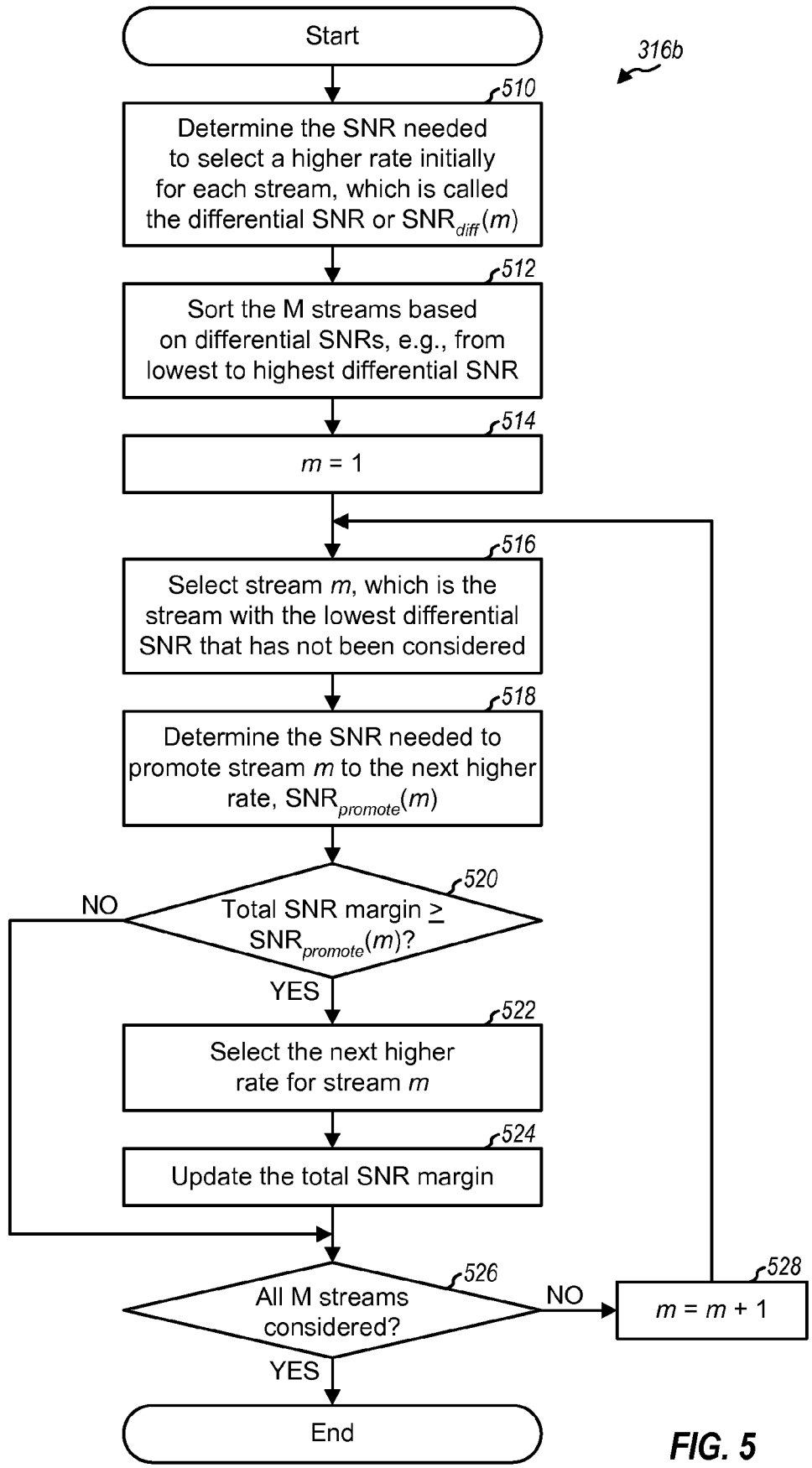
FIG. 5 shows a process for performing rank-ordered margin sharing.

FIG. 5 shows a process 316$b$ for performing rank-ordered margin sharing, which is a third embodiment of margin sharing for a system with independent rate per stream. Process 316$b$ may also be used for block 316 in FIG. 3.

The SNR needed to initially select a higher rate for each stream in block 312 of FIG. 3, which is also called the differential SNR, is determined (block 510), as follows:

$$SNR_{diff}(m) = \begin{cases} \infty & \text{if } R_m = R_{max}, \\ SNR_{req}(R_m+1) - SNR_{eff}(m) & \text{if } R_{max} > R_m \geq R_{min}. \end{cases} \quad \text{Eq (9)}$$

If the null rate Rmin is initially selected for stream m, then $SNR_{diff}(m)$ is equal to the SNR needed to promote stream m to the lowest non-null rate. If the highest supported rate Rmax is initially selected for stream m, then setting $SNR_{diff}(m)$ to infinity or a large value ensures that stream m will be selected last for margin sharing. The amount of SNR that may be reallocated to any one stream may be limited to $SNR_{re-allo}^{max}$, as described above. In this case, if the differential SNR for any stream is greater than $SNR_{re-allo}^{max}$, then the differential SNR may be set to infinity so that the stream will not be promoted.

The M streams are then sorted based on their differential SNRs, with the first stream having the lowest differential SNR and the last stream having the highest differential SNR (block 512). The stream index m is initialized to 1 (block 514).

Stream m, which is the stream with the lowest differential SNR that has not been considered, is selected (block 516). The SNR needed to promote stream m to the next higher rate is then determined as shown in equation (7) (block 518). The total SNR margin is computed with the assumption that rate Rm is initially selected for stream m, and the SNR margin for stream m is included in the total SNR margin. Thus, $SNR_{promote}(m)$ and not $SNR_{diff}(m)$ is needed to select the next higher rate $R_m+1$ for stream m. A determination is then made whether the total SNR margin is greater than or equal to the SNR needed to promote stream m to the next higher rate (block 520). If the answer is 'Yes', then the next higher rate is selected for stream m (block 522), and the total SNR margin is updated as shown in equation (8) (block 524).

After block 524, and also if the answer is 'No' for block 520, a determination is made whether all M streams have been considered (block 526). If the answer is 'No', then stream index m is incremented (block 528), and the process returns to block 516 to consider the stream with the next lower differential SNR. Otherwise, if all M streams have been considered, then the process terminates. The process may also terminate if the total SNR margin is zero or a small value (not shown in FIG. 5). Steps 514 through 528 may also be repeated any number of times until all of the available SNR margin is used up, or the streams have been promoted the maximum number of times, or no more streams may be promoted, or some other exit criterion is satisfied. The third embodiment promotes streams in an ordered manner such that (1) the stream that needs the least amount of SNR margin for promotion is promoted first and (2) the stream that needs the most amount of SNR margin is promoted last. This embodiment may improve performance and may allow more streams to be promoted.

In a fourth embodiment of margin sharing for a system with independent rate per stream, the SNR needed to promote each stream to the next higher rate is initially computed as shown in equation (7). The M streams are then ordered based on their promote SNRs, with the first stream having the lowest promote SNR and the last stream having the highest promote SNR. The M streams are then considered one at a time and in a sequential order starting with the stream having the lowest promote SNR. The fourth embodiment attempts to promote streams having smaller promote SNRs first, which may allow more streams to be promoted.

The margin sharing embodiments described above are for a system in which the rate for each stream can be independently selected. This allows the total SNR margin to be reallocated to any stream. The rate for each stream is adjusted to the next higher rate index $R_m+1$ if allowed by the total SNR margin.

The rate for a stream may also be promoted more than one rate index higher. In an embodiment, the rate for each stream may be promoted as much as possible based on the total SNR margin. For example, instead of calculating $SNR_{promote}(m)$ for stream m, the highest rate with a required SNR that is smaller than $SNR_{eff}(m)+SNR_{total\_margin}$ may be selected for stream m. In another embodiment, the rate for each stream may be promoted by a maximum of Q rate indices, where in general $Q \geq 1$. The embodiments shown above in FIGS. 4 and 5 are then for the case in which Q=1.

A system may allow only certain combinations of rates, e.g., in order to reduce the amount of rate information to send back to the transmitter. The set of rate combinations allowed by the system is often called a vector-quantized rate set. Table 2 shows an exemplary vector-quantized rate set for a system in which the transmitter can transmit up to four data streams. For this rate set, rate identifiers (IDs) 0 through 13 are for transmission of one data stream and are given in Table 1 as rate indices 0 through 13, respectively, rate IDs 14 through 24 are for transmission of two data streams, rate IDs 25 through 35 are for transmission of three data streams, and rate IDs 36 through 43 are for transmission of four data streams. For each rate ID, the number of streams to transmit (Num Str), the rate to use for each stream, and the overall throughput (OTP)/overall spectral efficiency are given in Table 2. As an example, for rate ID 31, the overall throughput is 12.0 bps/Hz, three streams are transmitted, rate 12 (256 QAM and code rate ¾) is used for stream 1, rate 9 (64 QAM and code rate ⅔) is used for stream 2, and rate 5 (16 QAM and code rate ½) is used for stream 3.

TABLE 2

| | | | Rate for Stream | | | |
|---------|-----------|---------|---|---|---|---|
| Rate ID | OTP bps/Hz | Num Str | 1 | 2 | 3 | 4 |
| 14 | 2.0 | 2 | 4 | 2 | — | — |
| 15 | 2.5 | 2 | 4 | 3 | — | — |

TABLE 2-continued

|        |         |         | Rate for Stream | | | |
| Rate ID | OTP bps/Hz | Num Str | 1 | 2 | 3 | 4 |
| --- | --- | --- | --- | --- | --- | --- |
| 16 | 3.0  | 2 | 5  | 3  | —  | — |
| 17 | 4.0  | 2 | 7  | 3  | —  | — |
| 18 | 4.5  | 2 | 7  | 4  | —  | — |
| 19 | 4.5  | 2 | 9  | 2  | —  | — |
| 20 | 6.0  | 2 | 10 | 4  | —  | — |
| 21 | 6.0  | 2 | 9  | 5  | —  | — |
| 22 | 8.0  | 2 | 12 | 5  | —  | — |
| 23 | 9.0  | 2 | 12 | 7  | —  | — |
| 24 | 12.0 | 2 | 12 | 12 | —  | — |
| 25 | 6.0  | 3 | 7  | 5  | 3  | — |
| 26 | 6.0  | 3 | 9  | 4  | 2  | — |
| 27 | 8.0  | 3 | 10 | 5  | 4  | — |
| 28 | 9.0  | 3 | 10 | 7  | 4  | — |
| 29 | 9.0  | 3 | 10 | 9  | 2  | — |
| 30 | 12.0 | 3 | 10 | 10 | 7  | — |
| 31 | 12.0 | 3 | 12 | 9  | 5  | — |
| 32 | 12.0 | 3 | 12 | 10 | 4  | — |
| 33 | 13.5 | 3 | 12 | 10 | 7  | — |
| 34 | 13.5 | 3 | 12 | 12 | 4  | — |
| 35 | 16.0 | 3 | 12 | 12 | 9  | — |
| 36 | 8.0  | 4 | 9  | 7  | 2  | 2 |
| 37 | 12.0 | 4 | 10 | 10 | 5  | 3 |
| 38 | 16.0 | 4 | 12 | 10 | 9  | 4 |
| 39 | 16.0 | 4 | 12 | 10 | 10 | 3 |
| 40 | 16.0 | 4 | 12 | 12 | 7  | 3 |
| 41 | 18.0 | 4 | 12 | 12 | 9  | 5 |
| 42 | 18.0 | 4 | 12 | 12 | 10 | 4 |
| 43 | 21.0 | 4 | 12 | 12 | 12 | 7 |

Rate control with margin sharing may be performed in various manners in a system with a vector-quantized rate set. Several embodiments are described below.

Figure 6:
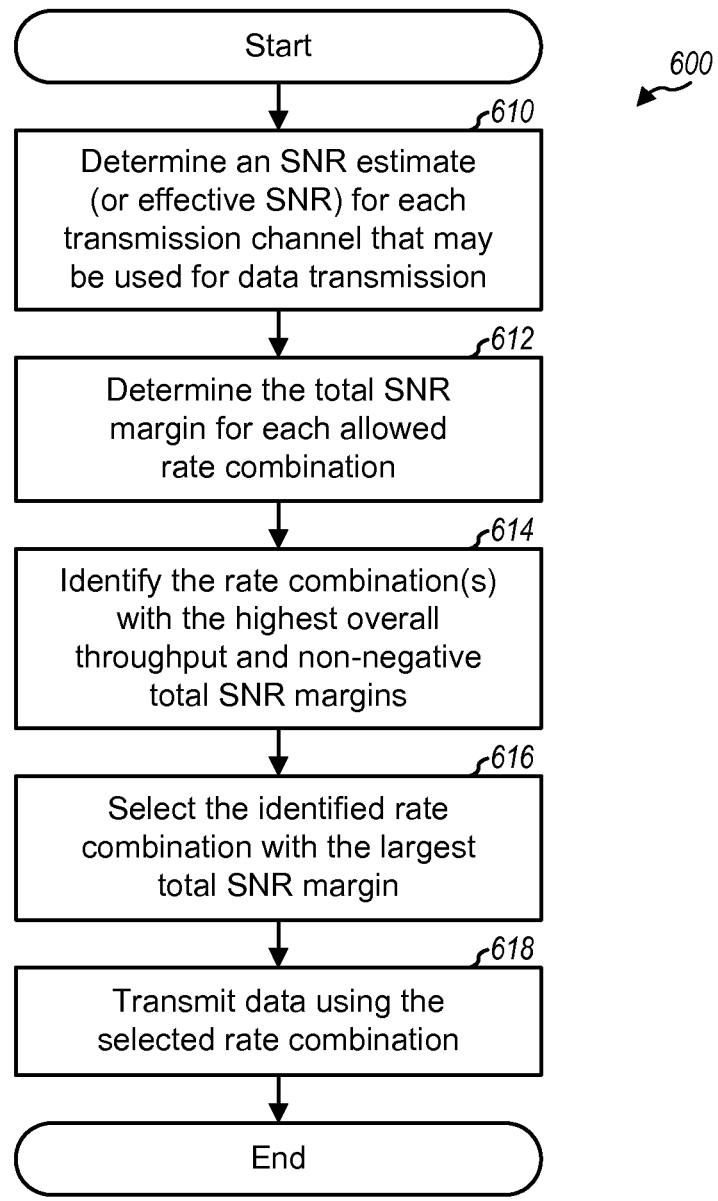
FIG. 6 shows a rate selection process for a vector-quantized rate set.

FIG. 6 shows a process 600 for selecting rates for data streams in a system with a vector-quantized rate set, in accordance with a first embodiment. Initially, the effective SNR for each transmission channel that may be used for data transmission is determined (block 610). The total SNR margin for each allowed rate combination is determined based on the effective SNRs (block 612). The total SNR margin for a given rate combination with L streams (where S≥L≥1) may be determined as follows. The SNR margin for each stream m in the rate combination is first computed as shown in equation (5), where $SNR_{eff}(m)$ is the effective SNR for the transmission channel used for stream m and $SNR_{req}(R_m)$ is the required SNR for the rate specified for stream m by the rate combination. Because the rate for each stream in the rate combination is specified, the SNR margin for each stream may be a positive or negative value. The total SNR margin is equal to the sum of the SNR margins for the L streams in the rate combination, as shown in equation (6). If the SNR margin for any stream in the rate combination is below a predetermined minimum value (e.g., −2 dB), then the total SNR margin for the rate combination may be set to minus infinity or some large negative value so that this rate combination will not be selected for use. If the number of streams to transmit is known, then only the rate combinations for that number of streams are evaluated.

The rate combination(s) with the highest overall throughput and non-negative total SNR margins are identified (block 614). Multiple rate combinations may be identified in block 614 if the rate set has more than one rate combination with the same overall throughput. For example, the rate set shown in Table 2 has five rate combinations with an overall throughput of 12.0 bps/Hz. The identified rate combination with the largest total SNR margin is selected for use (block 616). Data is then transmitted using the selected rate combination (block 618).

Figure 7:
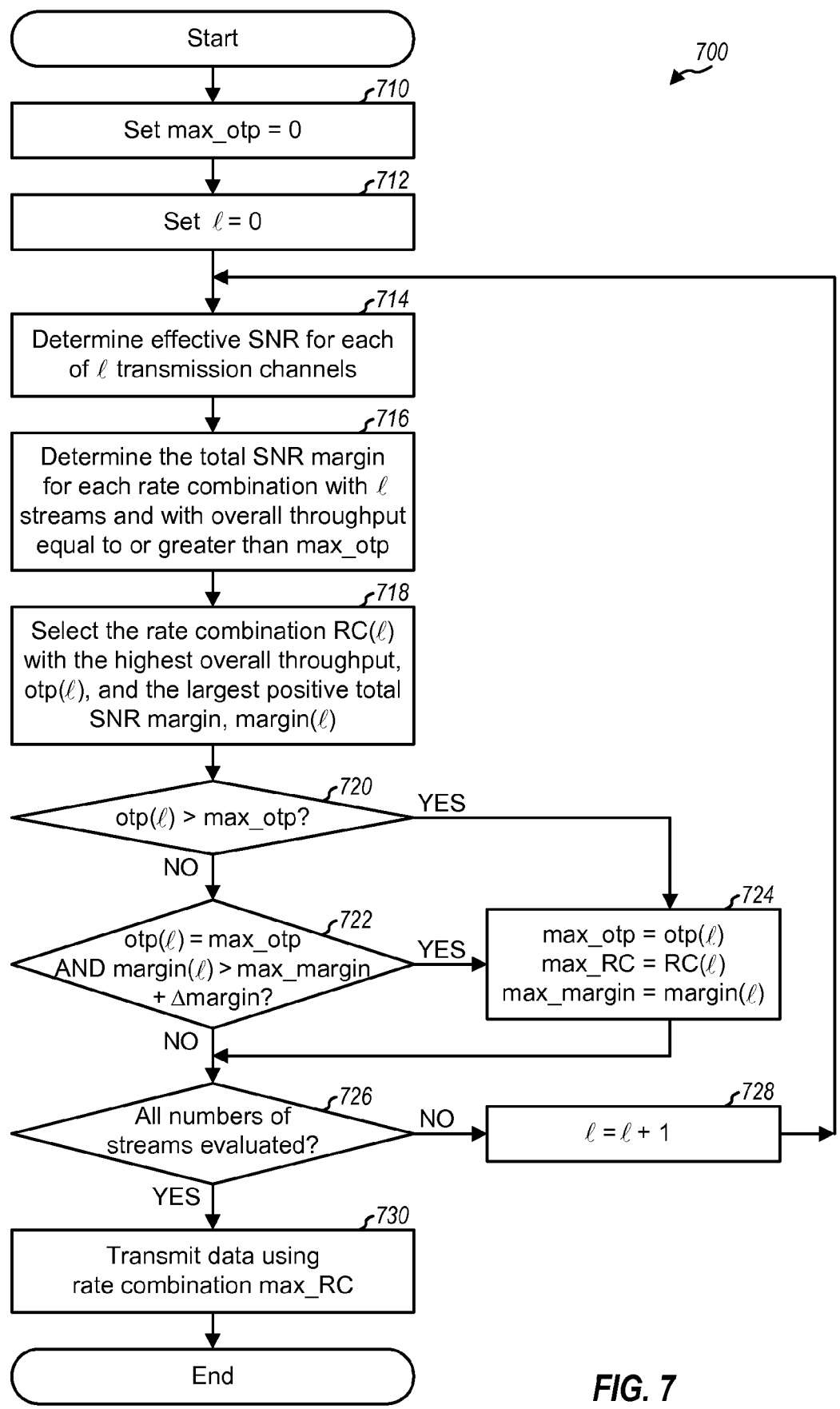
FIG. 7 shows another rate selection process for a vector-quantized rate set.

FIG. 7 shows a process 700 for selecting rates for data streams in a system with a vector-quantized rate set, in accordance with a second embodiment. A variable max_otp denotes the maximum overall throughput achieved for all data streams and is initialized to zero (block 710). An index l denotes the number of streams to transmit and is initialized to one (block 712).

The effective SNR for each of l transmission channels used to transmit l data streams is determined (block 714). As noted above, the effective SNR computation may be dependent on the spatial processing performed by the transmitter and the receiver for the l streams. The total SNR margin for each rate combination with l streams and an overall throughput greater than or equal to max_otp is determined (block 716), e.g., as described above for block 612 in FIG. 6. Margin sharing may or may not be applied for each rate combination that is evaluated in block 716. If margin sharing is applied, then any of the margin sharing embodiments described above for independent rate per stream (e.g., stream-ordered margin sharing, rank-ordered margin sharing, and so on) may be used.

The rate combination with the highest overall throughput and the largest positive total SNR margin is then selected from among all evaluated rate combinations with l streams (block 718), e.g., as described above for blocks 614 and 616 in FIG. 6. The selected rate combination is denoted as RC(l), the overall throughput for this rate combination is denoted as otp(l), and the total SNR margin for this rate combination is denoted as margin(l). A determination is then made whether the highest overall throughput for l streams is greater than the current maximum overall throughput, or whether otp(l)>max_otp (block 720). If the answer is 'Yes', then the maximum overall throughput is set to the highest overall throughput for l streams, the rate combination RC(l) is saved in a variable max_RC, and the total SNR margin for RC(l) is saved in a variable max margin (block 724). The process then proceeds to block 726.

If the answer is 'No' for block 720, then a determination is made whether (1) the highest overall throughput for l streams is equal to the current maximum overall throughput and (2) the total SNR margin for rate combination RC(l) exceeds the current max margin by a predetermined amount, which is denoted as Δmargin (block 722). If rate combination RC(l) for l streams and another rate combination RC(j) for fewer than l streams can achieve the same overall throughput, then rate combination RC(l) may be selected if it has a higher total SNR margin by the predetermined amount. Otherwise, rate combination RC(j) with fewer streams may be selected in order to (1) reduce the processing at the transmitter and the receiver and (2) increase protection from crosstalk among the streams. If the answer is 'Yes' for block 722, then the rate combination RC(l), the overall throughput for RC(l), and the total SNR margin for RC(l) are saved as max_RC, max_otp, and max_margin, respectively, in block 724.

If the answer is 'No' for block 722, and also after block 724, a determination is made whether all different numbers of streams have been evaluated (block 726). If the answer is 'No', then index l is incremented (block 728), and the process returns to block 714 to evaluate the next higher number of streams. Otherwise, if all different numbers of streams have been evaluated, then rate combination max_RC is selected for use, and data is transmitted using this selected rate combination (block 730).

Although not shown in FIG. 7 for simplicity, process 700 may be terminated if the highest overall throughput otp(l) for the current number of streams does not exceed the maximum overall throughput. For example, if the answer is 'No' for block 720, then the process may perform blocks 722 and 724 and then terminate.

In a third embodiment for selecting rates in a system with a vector-quantized rate set, a total required SNR is computed for each rate combination as the sum of the required SNRs for the specified rates for all of the streams in that rate combination. The total required SNRs and the overall throughputs for all rate combinations in the rate set may be stored in a look-up table. For rate selection, a total effective SNR is computed as the sum of the effective SNRs for all of the transmission channels that may be used for data transmission. The rate combination with the highest overall throughput and a total required SNR that is less than or equal to the total effective SNR is then selected for use. This embodiment does not limit the amount of SNR margin that may be re-allocated to each stream.

FIGS. 3 through 5 show exemplary embodiments for performing rate selection with margin sharing for a system with independent rate per stream. FIGS. 6 and 7 show exemplary embodiments for performing rate selection with margin sharing for a system with a vector-quantized rate set. The rate selection with margin sharing may also be performed in other manners. The margin sharing allows one or more streams to operate with negative SNR margin so that a higher overall throughput can be achieved for the data transmission.

As noted above, the rate selection with margin sharing techniques may be used for various systems and for various types of transmission channels. In a MIMO system, different transmission channels may be formed with the transmitter performing different spatial processing such as, e.g., eigensteering, no steering, and spatial spreading.

For eigensteering, the channel response matrix $\underline{H}(k)$ for each subband may be diagonalized via eigenvalue decomposition, as follows:

$$\underline{R}(k) = \underline{H}^H(k) \cdot \underline{H}(k) = \underline{E}(k) \cdot \underline{\Lambda}(k) \cdot \underline{E}^H(k), \quad \text{Eq (10)}$$

where $\underline{E}(k)$ is a unitary matrix of eigenvectors, $\underline{\Lambda}(k)$ is a diagonal matrix, and "H" denotes the conjugate transpose. The transmitter may transmit data on up to S orthogonal spatial channels (or eigenmodes) of each subband k using the steering matrix $\underline{E}(k)$. The diagonal matrix $\underline{\Lambda}(k)$ for each subband k contains the power gains for the S eigenmodes of $\underline{H}(k)$. The channel response matrix $\underline{H}(k)$ for each subband may also be diagonalized via singular value decomposition as $\underline{H}(k) = \underline{U}(k) \cdot \underline{\Sigma}(k) \cdot \underline{E}^H(k)$, where $\underline{U}(k)$ is a unitary matrix of left singular vectors, $\underline{E}(k)$ is a unitary matrix of right singular vectors (which is also the matrix of eigenvectors), and $\underline{\Sigma}(k)$ is a diagonal matrix of channel gains for the S eigenmodes of $\underline{H}(k)$.

For no steering, the transmitter transmits data without any spatial processing, e.g., transmits one data stream from each transmit antenna. For spatial spreading, the transmitter transmits data with different steering matrices $\underline{V}(k)$ that vary over the frequency band, so that the data transmission observes an ensemble of effective channels.

Table 3 shows the spatial processing performed by the transmitter for eigensteering, no steering, and spatial spreading. In Table 3, subscript "es" denotes eigensteering, "ns" denotes no steering, and "ss" denotes spatial spreading. The processing shown in Table 3 is for a given subband, and thus, the subband index k is omitted for clarity. $\underline{s}$ is a vector with up to S data symbols to be sent on one subband in one symbol period. $\underline{x}_x$ is a vector with up to T transmit symbols to be sent from the T transmit antennas on one subband in one symbol period for mode x, where "x" may be "es", "ns" or "ss". $\underline{H}_x$ is an effective channel response matrix observed by the data vector $\underline{s}$ for mode x.

TABLE 3

| | Transmitter Spatial Processing | | |
|---|---|---|---|
| | Eigensteering | No Steering | Spatial Spreading |
| Spatial Processing | $\underline{x}_{es} = E \cdot s$ | $\underline{x}_{ns} = s$ | $\underline{x}_{ss} = V \cdot s$ |
| Effective Channel | $\underline{H}_{es} = H \cdot E$ | $\underline{H}_{ns} = H$ | $\underline{H}_{ss} = H \cdot V$ |

The received symbols obtained by the receiver may be expressed as:

$$\underline{r} = \underline{H} \cdot \underline{x}_x + \underline{n} = \underline{H}_x \cdot \underline{s} + \underline{n}, \quad \text{Eq(11)}$$

where $\underline{r}_x$ is a vector of received symbols for mode x and $\underline{n}$ is a vector of noise, which may be assumed to be AWGN with a variance of $\sigma_n^2$.

Table 4 shows the spatial processing performed by the receiver to obtain detected symbols $\hat{\underline{s}}$, which are estimates of the transmitted data symbols in $\underline{s}$. The full channel state information (full-CSI) technique may be used for eigensteering. The channel correlation matrix inversion (CCMI) and minimum mean square error (MMSE) techniques may be used for eigensteering, no steering, and spatial spreading. For each technique, the receiver derives a spatial filter matrix $\underline{M}$ for each subband based on the actual or effective channel response matrix for that subband. The receiver then performs spatial matched filtering on the received symbols with the spatial filter matrix.

TABLE 4

| | Receiver Spatial Processing | |
|---|---|---|
| | Receiver Matched Filtering | Received SNR |
| Full-CSI | $M_{es} = \Lambda^{-1} \cdot E^H \cdot H^H$<br>$\hat{s}_{es} = M_{es} \cdot r_{es}$ | $\gamma_{es,m}(k) = 10 \log_{10}\left(\dfrac{P_m(k) \cdot \lambda_m(k)}{\sigma_n^2}\right)$ |
| CCMI | $M_{ccmi} = [H_x^H \cdot H_x]^{-1} \cdot H_x^H$<br>$\hat{s}_{ccmi} = M_{ccmi} \cdot r_x$ | $\gamma_{ccmi,m}(k) = 10 \log_{10}\left(\dfrac{P_m(k)}{r_m(k) \cdot \sigma_n^2}\right)$ |
| MMSE | $M_{mmse} = [H_x^H \cdot H_x + \sigma_n^2 \cdot I]^{-1} \cdot H_x^H$<br>$D_{mmse} = [\text{diag }[M_{mmse} \cdot H_x]]^{-1}$<br>$\hat{s}_{mmse} = D_{mmse} \cdot M_{mmse} \cdot r_x$ | $\gamma_{mmse,m}(k) = 10 \log_{10}\left(\dfrac{q_m(k)}{1 - q_m(k)} P_m(k)\right)$ |

Table 4 also shows the received SNR for each subband k of transmission channel m. For the full-CSI technique, $\lambda_m(k)$ is the m-th diagonal element of $\underline{\Lambda}(k)$. For the CCMI technique, $r_m(k)$ is the m-th diagonal element of $\underline{R}_x(k) = \underline{H}_x^H(k) \cdot \underline{H}_x(k)$. For the MMSE technique, $q_m(k)$ is the m-th diagonal element of $\underline{M}_{mmse}(k) \cdot \underline{H}_x(k)$.

Figure 8:
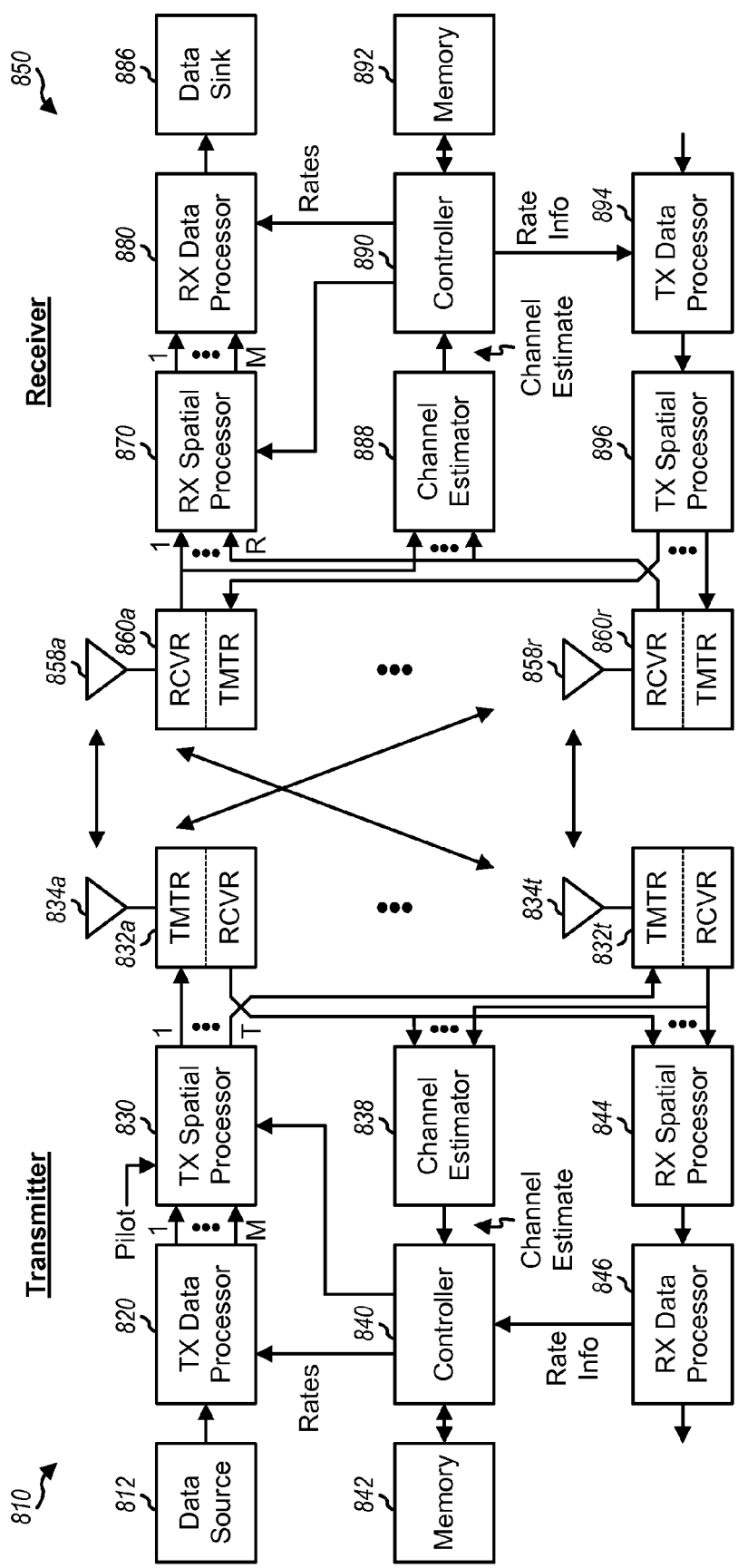
FIG. 8 shows a diagram of a transmitter and a receiver in a MIMO system.

FIG. 8 shows a block diagram of a transmitter 810 and a receiver 850 in a MIMO system. At transmitter 810, a TX data processor 820 receives traffic data from a data source 812, processes (e.g., formats, encodes, interleaves, and symbol maps) the traffic data, and provides M streams of data symbols. A TX spatial processor 830 performs spatial processing on the data symbols and pilot symbols (e.g., for eigensteering, no steering, or spatial spreading) and provides T streams of transmit symbols to T transmitter units (TMTR) 832a through 832t. Each transmitter unit 832 conditions a respective transmit symbol stream and generates a modulated signal. T modulated signals from transmitter units 832a through 832t are transmitted from T antennas 834a through 834t, respectively.

At receiver 850, R antennas 858a through 858r receive the modulated signals from transmitter 810, and each antenna provides a received signal to a respective receiver unit (RCVR) 860. Each receiver unit 860 performs processing complementary to the processing performed by transmitter units 832 and provides received symbols. An RX spatial processor 870 performs spatial matched filtering on the received symbols from all R receiver units 860 (e.g., with a spatial filter matrix derived using the full-CSI, CCMI, or MMSE technique) and provides M detected symbol streams. An RX data processor 880 processes (e.g., symbol demaps, deinterleaves, and decodes) the detected symbols and provides decoded data to a data sink 886.

Channel estimators 838 and 888 perform channel estimation for transmitter 810 and receiver 850, respectively. Controllers 840 and 890 control the operation of various processing units at transmitter 810 and receiver 850, respectively. Memory units 842 and 892 store data and program codes used by controllers 840 and 890, respectively.

For rate selection with margin sharing, channel estimator 888 estimates the response of the MIMO channel from transmitter 810 to receiver 850 and determines the received SNRs for the spatial channels of the MIMO channel. Controller 890 selects the rates for the M data streams based on the received SNRs, adjusts one or more of the rates upward with margin sharing, and provides rate information. The rate information is processed by a TX data processor 894 and a TX spatial processor 896, conditioned by transmitter units 860, and sent via antennas 858 to transmitter 810. At transmitter 810, the modulated signals from receiver 850 are received by T antennas 834, conditioned by T receiver units 832, and further processed by an RX spatial processor 844 and an RX data processor 846 to obtain the rate information from receiver 850. Controller 840 receives the rate information and provides the selected rates to TX data processor 820.

Figure 9:
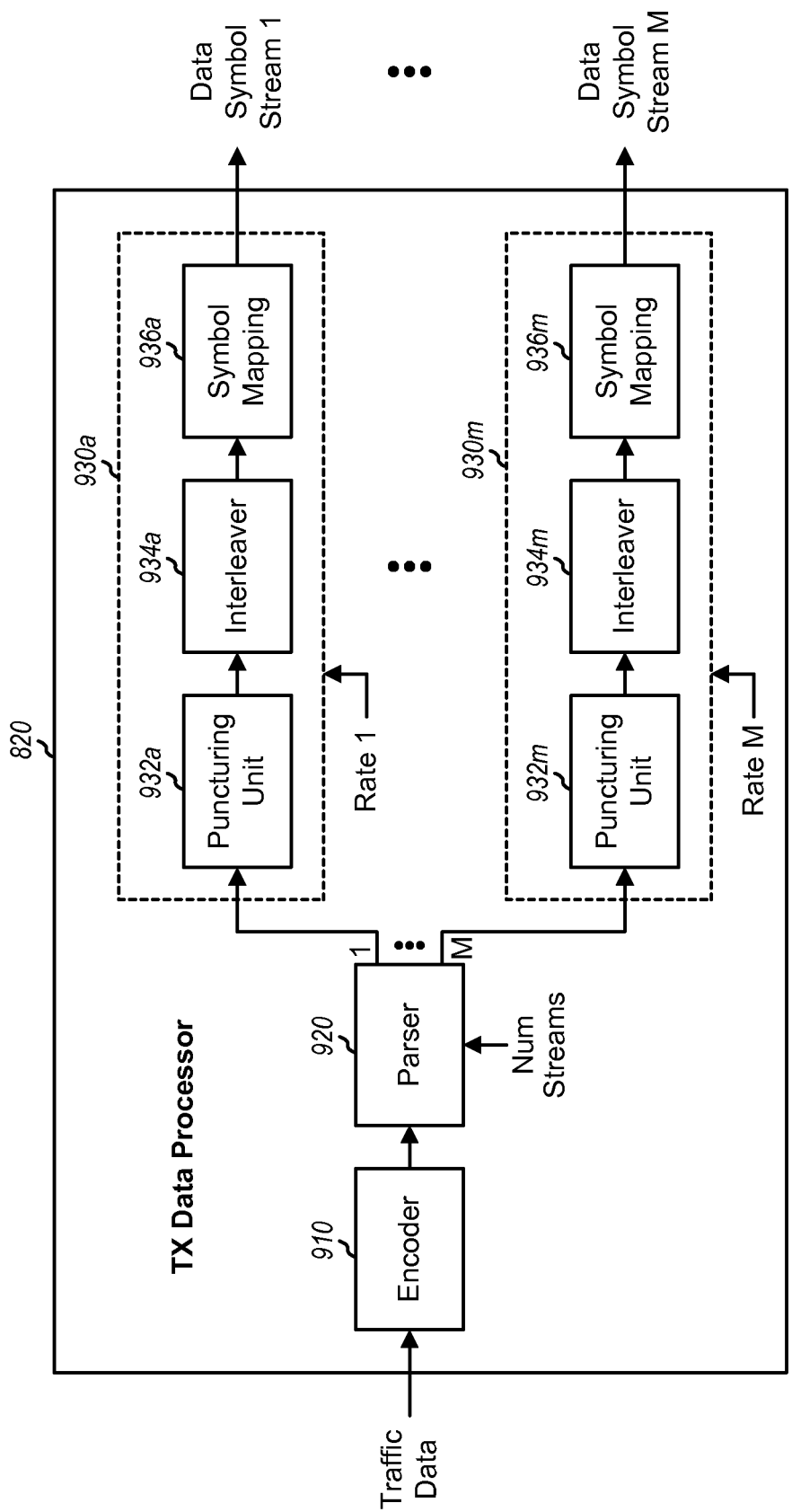
FIG. 9 shows a diagram of a transmit (TX) data processor at the transmitter.

FIG. 9 shows a block diagram of an embodiment of TX data processor 820 at transmitter 810. Within TX data processor 820, an encoder 910 encodes the traffic data in accordance with an encoding scheme and generates code bits. The encoding scheme may include a convolutional code, a Turbo code, a low density parity check (LDPC) code, a cyclic redundancy check (CRC) code, a block code, and so on, or a combination thereof. In an embodiment, encoder 910 implements a rate ½ binary convolutional encoder that generates two code bits for each data bit. A parser 920 receives the code bits from encoder 910 and parses the code bits into M streams.

M stream processors 930a through 930m receive the M streams of code bits from parser 920. Each stream processor 930 includes a puncturing unit 932, an interleaver 934, and a symbol mapping unit 936. Puncturing unit 932 punctures (or deletes) as many code bits in its stream as necessary to achieve a selected code rate for the stream. Interleaver 934 interleaves (or reorders) the code bits from puncturing unit 932 based on an interleaving scheme. Symbol mapping unit 936 maps the interleaved bits in accordance with a selected modulation scheme and provides modulation symbols. The code rate and modulation scheme for each stream are determined by the rate selected for the stream, e.g., as shown in Table 1. M stream processors 930a through 930m provide M streams of data symbols to TX spatial processor 830.

The rate selection with margin sharing techniques described herein may be implemented by various means. For example, these techniques may be implemented in hardware, software, or a combination thereof. For a hardware implementation, the processing units used to perform rate selection with margin sharing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the rate selection with margin sharing may be implemented with modules (e.g., procedures, functions, and so on) that perform the functions described herein. The software codes may be stored in a memory unit (e.g., memory units 142 and/or 192 in FIG. 1, memory units 842 and/or 892 in FIG. 8) and executed by a processor (e.g., controllers 140 and/or 190 in FIG. 1, controllers 840 and/or 890 in FIG. 8). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel feature disclosed herein.

What is claimed is:

1. A method of performing rate selection for data transmission over a plurality of transmission channels in a communication system, comprising:

obtaining a signal-to-noise ratio (SNR) estimate for each of the plurality of transmission channels;

determining a total SNR margin for each of a plurality of rate combinations based on the SNR estimates for the plurality of transmission channels, wherein each rate combination is associated with a specific number of the data streams to transmit, a specific rate for each data stream, and a specific overall throughput and wherein the plurality of rate combinations comprise at least two rate combinations associated with the same number of data streams to transmit but different combination of specific rates for each data stream; and selecting a rate combination from among the plurality of rate combinations based on total SNR margins and overall throughputs for the plurality of rate combinations, wherein selecting a rate combination comprises selecting a rate combination having a highest overall throughput among the plurality of rate combination and selecting a rate combination having fewer data streams if multiple rate combinations have the highest overall throughput.

2. The method of claim 1, wherein the determining the total SNR margin for each rate combination comprises
   determining an SNR margin for each data stream in the rate combination based on an SNR estimate for a transmission channel used for the data stream and a required SNR for the data stream, and
   summing SNR margins for all data streams in the rate combination to obtain the total SNR margin for the rate combination.

3. The method of claim 1, further comprising: removing each rate combination having at least one data stream with an SNR margin below a predetermined value.

4. A method of performing rate selection for data transmission over a plurality of transmission channels in a communication system, comprising:
   obtaining a signal-to-noise ratio (SNR) estimate for each of the plurality of transmission channels;
   determining a total SNR margin for each of a plurality of rate combinations based on the SNR estimates for the plurality of transmission channels, wherein each rate combination is associated with a specific number of the data streams to transmit, a specific rate for each data stream, and a specific overall throughput and wherein the plurality of rate combinations comprise at least two rate combinations associated with the same number of data streams to transmit but different combination of specific rates for each data stream; and
   selecting a rate combination from among the plurality of rate combinations based on total SNR margins and overall throughputs for the plurality of rate combinations, wherein selecting a rate combination comprises selecting a rate combination having a highest overall throughput among the plurality of rate combination and selecting a rate combination having a larger total SNR margin if multiple rate combinations have the highest overall throughput.

5. A method of performing rate selection for data transmission over a plurality of transmission channels in a communication system, comprising:
   obtaining a signal-to-noise ratio (SNR) estimate for each of the plurality of transmission channels;
   selecting the plurality of rate combinations in a sequential order for evaluation, starting with rate combinations having fewest data streams and concluding with rate combinations having most data streams;
   determining a total SNR margin for each of a plurality of rate combinations based on the SNR estimates for the plurality of transmission channels, wherein each rate combination is associated with a specific number of the data streams to transmit, a specific rate for each data stream, and a specific overall throughput and wherein the plurality of rate combinations comprise at least two rate combinations associated with the same number of data streams to transmit but different combination of specific rates for each data stream; and
   selecting a rate combination from among the plurality of rate combinations based on total SNR margins and overall throughputs for the plurality of rate combinations.

6. The method of claim 5, further comprising:
   selecting rate combinations for a given number of data streams in a sequential order for evaluation, starting with a rate combination having a lowest overall throughput and concluding with a rate combination having a highest overall throughput.

7. A hardware apparatus for performing rate selection in a communication system that has a plurality of transmission channels usable for data transmission, comprising:
   a channel estimator operative to obtain a signal-to-noise ratio (SNR) estimate for each of the plurality of transmission channels; and
   a controller operative to determine a total SNR margin for each of a plurality of rate combinations based on the SNR estimates for the plurality of transmission channels, and to select a rate combination from among the plurality of rate combinations based on total SNR margins and overall throughputs for the plurality of rate combinations, wherein each rate combination is associated with a specific number of data streams to transmit, a specific rate for each data stream, and a specific overall throughput and wherein the plurality of rate combinations comprise at least two rate combinations associated with the same number of data streams to transmit but different combination of specific rates for each data stream, and wherein the controller is operative to select a rate combination having a highest overall throughput among the plurality of rate combinations and select a rate combination having fewer data streams or a larger total SNR margin if multiple rate combinations have the highest overall throughput.

8. The apparatus of claim 7, wherein the controller is operative to determine an SNR margin for each data stream in each rate combination based on an SNR estimate for a transmission channel used for the data stream and a required SNR for the data stream, and to sum SNR margins for all data streams in each rate combination to obtain the total SNR margin for the rate combination.

9. An apparatus for performing rate selection in a communication system that has a plurality of transmission channels usable for data transmission, comprising:
   means for obtaining a signal-to-noise ratio (SNR) estimate for each of a plurality of transmission channels;
   means for determining a total SNR margin for each of a plurality of rate combinations based on the SNR estimates for the plurality of transmission channels, wherein each rate combination is associated with a specific number of data streams to transmit, a specific rate for each data stream, and a specific overall throughput and wherein the plurality of rate combinations comprise at least two rate combinations associated with the same number of data streams to transmit but different combination of specific rates for each data stream; and
   means for selecting a rate combination from among the plurality of rate combinations based on total SNR margins and overall throughputs for the plurality of rate combinations, wherein the means for selecting a rate combination comprises:
   means for selecting a rate combination having a highest overall throughput among the plurality of rate combinations, wherein the means for selecting the rate combination from among the plurality of rate combinations comprises means for selecting a rate combination having fewer data streams or a larger total SNR margin if multiple rate combinations have the highest overall throughput.

10. The apparatus of claim 9, wherein the means for determining the total SNR margin for each rate combination comprises means for determining an SNR margin for each data stream in the rate combination based on an SNR estimate for a transmission channel used for the data stream and a required SNR for the data stream, and means for summing SNR margins for all data streams in the rate combination to obtain the total SNR margin for the rate combination.

11. A non-transitory memory unit having stored therein software codes executable by a processor, wherein said software codes when executed by the processor cause the processor to:

obtain a signal-to-noise ratio (SNR) estimate for each of a plurality of transmission channels;

determine a total SNR margin for each of a plurality of rate combinations based on the SNR estimates for the plurality of transmission channels, wherein each rate combination is associated with a specific number of data streams to transmit, a specific rate for each data stream, and a specific overall throughput and wherein the plurality of rate combinations comprise at least two rate combinations associated with the same number of data streams to transmit but different combination of specific rates for each data stream; and select a rate combination from among the plurality of rate combinations based on total SNR margins and overall throughputs for the plurality of rate combinations, wherein the selected rate combination has a highest overall throughput among the plurality of rate combinations and the selected rate combination has fewer data streams if multiple rate combinations have the highest overall throughput.

12. The non-transitory memory unit of claim 11, wherein said instructions when executed by the processor further cause the processor to:

determine an SNR margin for each data stream in the rate combination based on an SNR estimate for a transmission channel used for the data stream and a required SNR for the data stream, and sum SNR margins for all data streams in the rate combination to obtain the total SNR margin for the rate combination.

13. The non-transitory memory unit of claim 11, wherein said instructions when executed by the processor further cause the processor to:

select a rate combination having fewer data streams or a larger total SNR margin if multiple rate combinations have the highest overall throughput.

14. A hardware apparatus for performing rate selection for data transmission over a plurality of transmission channels in a communication system, comprising:

a channel estimator operative to obtain a signal-to-noise ratio (SNR) estimate for each of the plurality of transmission channels; and a controller operative to determine a total SNR margin for each of a plurality of rate combinations based on the SNR estimates for the plurality of transmission channels, wherein each rate combination is associated with a specific number of the data streams to transmit, a specific rate for each data stream, and a specific overall throughput and wherein the plurality of rate combinations comprise at least two rate combinations associated with the same number of data streams to transmit but different combination of specific rates for each data stream, select the plurality of rate combinations in a sequential order for evaluation, starting with rate combinations having fewest data streams and concluding with rate combinations having most data streams, and select a rate combination from among the plurality of rate combinations based on total SNR margins and overall throughputs for the plurality of rate combinations.

* * * * *